(12) United States Patent
Huegel et al.

(10) Patent No.: US 8,776,140 B2
(45) Date of Patent: Jul. 8, 2014

(54) ENHANCED TELEVISION SERVICES

(75) Inventors: Michael L. Huegel, Cherry Hill, NJ (US); Patrick P. Huegel, Cherry Hill, NJ (US)

(73) Assignee: icueTV, Inc., Cherry Hill, NJ (US)

( * ) Notice: Subject to any disclaimer, the term of this patent is extended or adjusted under 35 U.S.C. 154(b) by 304 days.

(21) Appl. No.: 13/372,707

(22) Filed: Feb. 14, 2012

(65) Prior Publication Data

US 2012/0144414 A1 Jun. 7, 2012

Related U.S. Application Data

(63) Continuation of application No. 12/552,235, filed on Sep. 1, 2009, now Pat. No. 8,132,212.

(60) Provisional application No. 61/093,713, filed on Sep. 2, 2008, provisional application No. 61/144,772, filed on Jan. 15, 2009.

(51) Int. Cl.
| | |
|---|---|
| *H04N 5/445* | (2011.01) |
| *G06F 13/00* | (2006.01) |
| *G06F 3/00* | (2006.01) |
| *H04N 21/478* | (2011.01) |
| *H04N 7/173* | (2011.01) |
| *H04N 21/4722* | (2011.01) |
| *H04N 21/475* | (2011.01) |
| *H04N 21/8545* | (2011.01) |
| *G06Q 30/06* | (2012.01) |
| *G06Q 10/06* | (2012.01) |
| *H04N 21/442* | (2011.01) |
| *H04N 21/472* | (2011.01) |
| *H04N 21/422* | (2011.01) |
| *G06Q 20/10* | (2012.01) |
| *H04N 7/16* | (2011.01) |
| *H04N 21/466* | (2011.01) |

(52) U.S. Cl.
CPC ......... *H04N 7/173* (2013.01); *H04N 21/47815* (2013.01); *H04N 21/4722* (2013.01); *H04N 21/4758* (2013.01); *H04N 21/8545* (2013.01); *G06Q 30/0601* (2013.01); *G06Q 10/0637* (2013.01); *H04N 21/44222* (2013.01); *H04N 21/472* (2013.01); *H04N 21/42204* (2013.01); *G06Q 20/10* (2013.01); *H04N 7/163* (2013.01); *H04N 21/4667* (2013.01)
USPC ............................... 725/60; 725/13; 725/136

(58) Field of Classification Search
CPC .................................................. H04N 7/17318
USPC ........................................ 725/13, 60–61, 136
See application file for complete search history.

(56) References Cited

U.S. PATENT DOCUMENTS 7,237,253 B1 * 6/2007 Blackketter et al. ............ 725/61
(Continued)

OTHER PUBLICATIONS

PCT Written Opinion of the International Searching Authority for corresponding PCT International Application No. PCT/US2009/055635, International filing date: Jan. 9, 2009, dated Apr. 29, 2010 (4 pages).
PCT International Search Report for corresponding PCT International Application No. PCT/US2009/055635, International filing date: Jan. 9, 2009, dated Apr. 29, 2010 (3 pages).

(Continued)

*Primary Examiner* — Hunter B Lonsberry
(74) *Attorney, Agent, or Firm* — Mendelsohn, Drucker & Dunleavy, P.C.; Steve Mendelsohn

(57) ABSTRACT

A method and system to permit TV viewers to interact with program content broadcast over a subscriber network, such as cable, satellite, internet, or cellular telephone. The details of the ability for the viewer to interact is embedded as data in the program signal. The subscription provider broadcasts a visual indicator as a small icon during programming that informs the viewer that interaction is permitted. The viewer then uses a remote control to purchase products, vote on events, respond to polls, download files, request information, and request callback actions. The TV viewer uses the remote control to send information to a set-top box front-end application, and to iteratively create transactions that are batched and then sent to a back-end core application and database which then handles fulfillment.

78 Claims, 28 Drawing Sheets

ETS Edge – Entry point 1.0

(56) References Cited

U.S. PATENT DOCUMENTS

| | | |
|---|---|---|
| 2002/0157101 A1 | 10/2002 | Schrader et al. |
| 2002/0184623 A1 | 12/2002 | Hodge et al. |
| 2003/0126611 A1 | 7/2003 | Chernock et al. |
| 2004/0003406 A1 | 1/2004 | Billmaier |
| 2004/0249726 A1 | 12/2004 | Linehan |
| 2006/0031285 A1 | 2/2006 | Ruhnke et al. |
| 2006/0184989 A1 | 8/2006 | Slothouber |
| 2007/0192206 A1* | 8/2007 | Manesh et al. ............... 705/26 |
| 2009/0018898 A1 | 1/2009 | Genen |

OTHER PUBLICATIONS

PCT International Search Report for corresponding PCT International Application No. PCT/US2009/069882, International filing date: Dec. 31, 2009, dated Apr. 29, 2010 (3 pages).

Non-Final Office Action; Mailed Dec. 13, 2011 for corresponding U.S. Appl. No. 12/552,235.

Notice of Allowance; Mailed Jan. 6, 2012 for corresponding U.S. Appl. No. 12/552,235.

* cited by examiner

Extended Description

| Notes | Module | Ref. |
|---|---|---|
| 1. Get all request parameters such as MAC address, IP, Event name, Event type, Panel id etc. | ETSE-ENT | 1.1 |
| 2. If any request parameter is invalid, return error event panel | ETSE-ENT | 1.2 |
| 3. If session available update it based on the current request. If session not available, create new session for the current request. | ETSE-ENT | 1.3 |
| 4. Vary the event type that can be purchase or download or polling or info request or view transaction history | ETSE-ENT | 1.4 |
| 5. Based on the current event type, call the specific process | ETSE-ENT | 2.0, 3.0, 4.0, 5.0, 7.0 |

FIG. 9

Extended Description

| Notes | Module | Ref. |
|---|---|---|
| 1. Get purchase activity data from request | ETSE-PUR | 2.1 |
| 2. If event not found, update session and return error event panel. If event found, move to process step 3 | ETSE-PUR | 2.2 |
| 3. If it is first panel, move to process step 4. If it is not first panel, move to process step 5 | ETSE-PUR | 2.3 |
| 4. If the products not found for the selected event, update session and return error event panel. If the products found, move to process step 6 | ETSE-PUR | 2.4 |
| 5. If next panel found, move to process step 6. If next panel not found, move to process step 9 | ETSE-PUR | 2.5 |
| 6. Retrieve next panel template | ETSE-PUR | 2.6 |
| 7. Populate dynamic data such as price, quantity etc | ETSE-PUR | 2.7 |
| 8. Apply promotional logic, if any, update session and return next event panel | ETSE-PUR | 2.8 |
| 9. If the event needs PIN, call authentication process. The authentication process can return either a flag or XML based on the scenario.<br>9.1 - If the flag is VALID, process the order, move to step 11<br>9.2 - If the flag is INVALID, update the session and return event panel with message as "Wrong PIN entered and please call customer support"<br>9.4 - If XML is returned, verify the type of XML, update session and return event panel<br>9.5. If the event does not need PIN authentication, move to step 11 | ETSE-PUR | 2.9 |
| 10. If the user is child and he/she purchase exceeds the transaction limit, add into his/her parents wish list, update session and return event panel with message such as "Wrong PIN entered and products added to the wish list" | ETSE-PUR | 2.10 |
| 11. Process the order, update session and return last event panel. | ETSE-PUR | 2.11 |

FIG. 12

Extended Description

| Notes | Module | Ref. |
|---|---|---|
| 1. Get request data | ETSE-DOW | 3.1 |
| 2. If event not found, update session and return Error event panel | ETSE-DOW | 3.2 |
| 3. If it is first panel, move to process step 4 | ETSE-DOW | 3.3 |
| 4. Read download detail from database, update session and return download event panel | ETSE-DOW | 3.4 |
| 5. If next panel found, move to process step 6 | ETSE-DOW | 3.5 |
| 6. Retrieve next panel template | ETSE-DOW | 3.6 |
| 7. Populate dynamic data | ETSE-DOW | 3.7 |
| 8. Apply promotional logic if any, update session and return next event panel | ETSE-DOW | 3.8 |
| 9. If the event needs PIN, call authentication process. The authentication process can return either a flag or XML based on the type of case. 9.1 - If the flag is VALID, move to process step 11 9.2 - If the flag is INVALID&BLACKLIST, move to process step 10 9.3 - If the flag is INVALID&ANYMOUS, move to process step 10 9.4 - If XML is returned, verify the type of xml, update the session and return event panel | ETSE-DOW | 3.9 |
| 10. When the return flag is invalid, update the status in the database, update session and return event panel with a message as 'Wrong PIN entered and Please call customer service' | ETSE-DOW | 3.10 |
| 11. Process the download, update session and return last event panel | ETSE-DOW | 3.11 |

FIG. 15

Extended Description

| Notes | Module | Ref. |
|---|---|---|
| 1. Get poll / vote activity request data | ETSE-POL | 4.1 |
| 2. If event not found, update session and return Error event panel | ETSE-POL | 4.2 |
| 3. If it is first panel, move to process step 4 | ETSE-POL | 4.3 |
| 4. Read poll data from database | ETSE-POL | 4.4 |
| 5. If next panel found, move to process step 8 | ETSE-POL | 4.5 |
| 6. Retrieve next panel template | ETSE-POL | 4.6 |
| 7. Populate dynamic data | ETSE-POL | 4.7 |
| 8. Apply promotional logic, if any, update session and return next event panel | ETSE-POL | 4.8 |
| 9. If it is a live poll, aggregate the result | ETSE-POL | 4.9 |
| 10. If it is a billable poll, create an order | ETSE-POL | 4.10 |
| 11. If the poll exceeds STB quota, drop the poll and return Error event panel | ETSE-POL | 4.11 |
| 12. If the event needs PIN, call authentication process. The authentication process can return either a flag or XML, based on the type of case.<br>9.1 - If the flag is VALID, move process step 14<br>9.2 - If the flag is INVALID&BLACKLIST, move to process step 13<br>9.3 - If the flag is INVALID&ANANYMOUS, move to process step 13<br>9.4 - If XML is returned, verify the type of XML, update session and return Event Panel | ETSE-POL | 4.12 |
| 13. Add into invalid voter list, update session and return event panel with necessary messages such as 'wrong PIN entered and please call customer support' | ETSE-POL | 4.13 |
| 14. Process poll data, update session and return last Event panel. | ETSE-POL | 4.14 |

FIG. 18

Extended Description

| Notes | Module | Ref. |
|---|---|---|
| 1. Get request info data | ETSE-REQ | 5.1 |
| 2. If event not found, update session and return Error event panel | ETSE-REQ | 5.2 |
| 3. If it is first panel, move to process step 4 | ETSE-REQ | 5.3 |
| 4. Read requested detail from database, update session and return request info event panel | ETSE-REQ | 5.4 |
| 5. If next panel found, move to process step 6 | ETSE-REQ | 5.5 |
| 6. Retrieve next panel template | ETSE-REQ | 5.6 |
| 7. Populate dynamic data | ETSE-REQ | 5.7 |
| 8. Apply promotional logic if any, update session and return next event panel | ETSE-REQ | 5.8 |
| 9. If the event needs PIN, call authentication process. The authentication process can return either a flag or XML based on the type of case. 9.1 - if the flag is VALID, process the order, move to process step 11 9.2 - if the flag is INVALID&BLACKLIST, move to process step 13 9.3 - if the flag is INVALID&ANANYMOUS, move to process step 10 9.4 - if XML is returned, verify the xml type, update the session and return event panel | ETSE-REQ | 5.9 |
| 10. When the entered PIN is invalid, verify the status in the database, update session and return event panel with a message as "Wrong PIN entered and please call customer service" | ETSE-REQ | 5.10 |
| 11. Process request info, update session and return last event panel | ETSE-REQ | 5.11 |

FIG. 21

Extended Description

| Notes | Module | Ref. |
|---|---|---|
| 1. Get authentication data | ETSE-AUT | 6.1 |
| 2. If the MAC is black listed, update the session and return flag as 'INVALID&BLACKLIST' | ETSE-AUT | 6.2 |
| 3. If the user is new user, move to step 4 | ETSE-AUT | 6.3 |
| 4. If the phone is already in use, update the session and return Phone event panel | ETSE-AUT | 6.4 |
| 5. After adding the phone into database, return event panel with a message as 'Please register with the portal with the same phone' | ETSE-AUT | 6.5 |
| 6. If the phone is invalid, black out the MAC, update the session and return the flag as 'INVALID&BLACKLIST' | ETSE-AUT | 6.6 |
| 7. If the PIN is valid, update the session and return a flag as 'VALID' | ETSE-AUT | 6.7 |
| 8. If the number of attempts exceed the limit, update the session and return a flag as 'INVALID&ANONYMOUS'. If the number of attempts within the limit, then update the session and return Phone and PIN event panel. | ETSE-AUT | 6.8 |

FIG. 24

Extended Description

| Notes | Module | Ref. |
|---|---|---|
| 1. Get request info data | ETSE-REQ | 7.1 |
| 2. If event not found, update session and return Error event panel | ETSE-REQ | 7.2 |
| 3. If it is first panel, move to process step 4 | ETSE-REQ | 7.3 |
| 4. Read requested detail from database, update session and return request info event panel | ETSE-REQ | 7.4 |
| 5. If next panel found, move to process step 6 | ETSE-REQ | 7.5 |
| 6. Retrieve next panel template | ETSE-REQ | 7.6 |
| 7. Populate dynamic data | ETSE-REQ | 7.7 |
| 8. Apply promotional logic if any, update session and return next event panel | ETSE-REQ | 7.8 |
| 9. If the event needs PIN, call authentication process. The authentication process can return either a flag or XML based on the type of case. | ETSE-REQ | 7.9 |
| 9.1 - If the flag is VALID, process the order, move to process step 11 9.2 - If the flag is INVALID&BLACKLIST, move to process step 10 9.3 - If the flag is INVALID&ANONYMOUS, move to process step 10 9.4 - If XML is returned, verify the xml type, update the session and return event panel | | |
| 10. When the entered PIN is invalid, update the status in the database, update session and return event panel with a message as "Wrong PIN entered and please call customer service" | ETSE-REQ | 7.10 |
| 11. Process request info, update session and return transaction history event panel | ETSE-REQ | 7.11 |

FIG. 27

ENHANCED TELEVISION SERVICES

CROSS REFERENCE TO RELATED APPLICATIONS

The Present Application is a continuation of U.S. patent application Ser. No. 12/552,235, filed on Sep. 1, 2009 ("the Parent Application"). The Parent Application is the non-provisional counterpart to U.S. Provisional Patent Application Ser. No. 61/093,713 filed on Sep. 2, 2008, entitled ENHANCED TELEVISION SERVICES. The Parent Application is also a non-provisional counterpart to U.S. Provisional Patent Application Ser. No. 61/144,772 filed on Jan. 15, 2009, entitled ENHANCED TELEVISION SERVICES—BACK END CORE SOFTWARE. The Parent Application claims the benefit of and priority to both provisional applications, namely U.S. 61/093,713 and U.S. 61/144,772, which, along with the Parent Application, are incorporated by reference into this Present Application in their entirety.

BACKGROUND OF THE INVENTION

Historically, television technology developed so as to mirror radio technology. Television was broadcast via electromagnetic waves in analog mode. Television pictures were broadcast using amplitude modulation (AM band), and sound was broadcast using frequency modulation (FM band). As with radio, a television viewer had control over three elements:
1. on-off control,
2. channel control, and
3. volume control.

During the early 1970's, infrared remote controls were introduced to control these same elements on television sets. Until that time, television broadcasting was limited by relatively low bandwidth. The number of channels and controls were limited by bandwidth. Establishment of new television stations were limited by the Federal Communications Commission (FCC). The problem was somewhat alleviated by introduction of ultra-high frequency (UHF) broadcast capability. However, UHF channels never achieved much popularity. Cable television service provided television transmission with increased bandwidth. Suddenly, television viewers were able to access a large multitude of channels. Some television stations broadcasted their programming exclusively for cable, while others simulcast their programs both over the airwaves (electromagnetic) and over cable. Other than the increased number of channels, the main discernible difference between "cable TV" and "broadcast TV" was that viewers had to pay for cable service while broadcast TV remained essentially free. Cable providers provided their users with a "cable box" to enable tuning control. Cable-ready television sets were developed to enable users to plug the cable directly into their sets.

Without a list of what programs were playing on what channels at a given time, viewers would have to "channel surf" until they found programs that they wanted to watch. Cable service providers began to transmit a program "guide" that was accessed from the remote control. Previously, viewers used newspaper listings and magazine type guides to help with their programming selection. Now, a viewer could use the remote control to select and switch to a channel based upon a desired program. So, the number of control elements were increased.

Next, the cable service providers introduced "Pay Per View" programming. Here, not only could a viewer select a special program for viewing at a specific time, but they could also approve (e.g., by pressing the OK button) or not approve (e.g., by pressing the EXIT button) the charges associated with viewing the selected program. With the introduction of digital (as opposed to analog) transmission to cable broadcasting, parents could block channels or specific programs that they did not want their children to watch. On-Demand programming provided viewers with new options that would enable them to watch special programs whenever they wanted. Finally, DVR afforded viewers with the ability to record programs, to time-shift viewing, to pause live TV, and to rewind and move forward through recorded programs and live TV.

All of these new features required the introduction of television remote control units having many more controls than the traditional on-off, volume, and channel controls. Not only are remote controls themselves more sophisticated, but many new television sets may only be controlled using remote controls. These new sets no longer have external controls. Even the brightness, contrast, color, and hue settings are now controlled remotely. Viewers can use their remote controls to control television settings separately form cable settings. They can also use their remote controls to control peripheral devices such as VCR's, DVD's, CD players, etc. With the availability of high-speed internet service over cable television lines, keyboards are often connected to television sets for access to the internet. In some hotels, television viewers can pay their lodging bill by using the remote control. Into the television provider mix also came local telephone companies and satellite broadcasters. These providers advertise even greater increases in bandwidth and possibly more services. So, control over television viewing has become quite sophisticated.

Nevertheless, television viewing essentially remains as a passive activity. Viewers still only turn their sets on or off, control the volume, and select what they want to watch either now or in the future. Cable providers are able to determine what programs are being watched by their viewers. But, viewers cannot actively communicate with cable providers or broadcasters while watching television.

Interactive television is very attractive to cable service providers. Cable companies are in the process of adopting the "Enhanced TV Binary Interchange Format" (EBIF) and the "Open Cable Application Platform" (OCAP). EBIF is a multimedia content format defined by a specification developed under the "OpenCable" project of CableLabs (Cable Television Laboratories, Inc.). The primary purpose of EBIF is to present to a television viewer one or more multimedia pages, similar to web pages, but specialized for use within an enhanced television or an interactive television system. Action sequences are executed as a result of firing certain predefined events, such as a page load event, a key press event, a click event, etc. These events are triggered by the viewer using the remote control. Execution of all events are serialized and controlled by event handlers. On the other hand, OCAP, is an operating system layer designed for consumer electronics that connects to a television system Unlike operating systems on a personal computer, the cable company controls what OCAP programs run on the consumer's set. Also designed by CableLabs for the cable networks of North America, OCAP programs are intended for interactive services such as eCommerce, online banking, Electronic program guides, and digital video recording. The OCAP standard has not yet been approved by the FCC.

A Multiple System Operator (MSO) is an operator of multiple cable television systems. A cable system in the US, by FCC definition, is a facility serving a single community or a distinct governmental entity, each with its own franchise agreement with the cable company. Though in the strictest sense any cable company that serves multiple communities is thus an MSO, the term today is usually reserved for companies that own a very large number of cable systems.

A number of systems currently exist to purchase items associated with content broadcast over television. An intuitive mechanism for accomplishing such a task would be to have a website associated with a television program. The TV viewer would have a computer alongside the television set. The TV viewer accesses the broadcast content and the website concurrently. Interaction with the broadcast content occurs over the internet on the computer. One such implementation is employed by http://www.shopnbc.com. This corresponds to an NBC network cable channel, shopNBC. This channel is a home shopping channel where viewers can purchase products that they see on television. However, instead of calling a telephone number to make their purchases, viewers purchase the products over the World Wide Web. A web application exists on the website that allows viewers to watch the programming streaming on their computers, thereby eliminating the necessity of having a separate television set alongside the computer. This application exists for the shopNBC channel only, and viewers cannot switch to watching other channels.

US Patent Application Publication No. 2006/0031285 to Ruhnke, et. al. teaches an audio and video On Demand type application along with the business functions required therefore. On Demand programming is not truly interactive. While a TV viewer may use a remote control to access the content, that does not happen interactively with broadcast content. On the other hand, US Patent Application Publication No. 2009/10018898 to Genen, teaches a method of interactively accessing music and other media associated with broadcast content using a remote control. However, there is no back end application associated with this application to provide for fulfillment. The website http://ensequence.com provides synchronized interactivity using a remote control. This application permits a TV viewer to purchase products, vote, receive targeted offers, access sports specifications. It also permits children and teenagers to participate in the activities programmed into the broadcast content. However, this application also lacks a back end to provide for fulfillment.

SUMMARY OF THE INVENTION

The Present Invention provides a way to cater to an untapped market through an innovative suite of products and services bundled as Enhanced Television Service (ETS). ETS functions both on an EBIF and OCAP platform. The Present Invention delivers a host of interactive functions specifically tailored to the broadcast program or commercials. The enhanced and empowered media is then transmitted to the MSO in any one of the many available formats for eventual transmission to the viewer. Invisible and unobtrusive until invoked by the viewer's existing remote control, the enhanced media suddenly reveals a wealth of onscreen information and choices. With no additional equipment installation or modification, the standard cable television remote control transforms the once passive viewer into a participant ordering information downloads, voting, responding and making instant purchases. The ETS handles all of these transactions from order processing to billing and fulfillment. By delivering a host of interactive functions, cable television operators empowered with the ETS solution can increase their competitive position while maximizing their networks financial potential. Through an intuitive portal application, advertisers are able to create and manage their own enhanced television events. They control the look, feel and exact moment the trigger is available to the viewer. Advertisers/Vendors can also upload products for sale or download and associate them with events described above. The portal also provides statistical data on the performance of events in a dashboard like manner. Also through an intuitive web portal subscribers can look at order history, wish lists, download items and purchase promotional products. This web portal resides in the MSO's web portal. Again ETS handles all of these transactions from order processing to billing and fulfillment.

A TV viewer will hereinafter be referred to interchangeably as a subscriber or a viewer. Subscribers can interact with the broadcast program or commercial with the remote control. They can participate in the following transactions using the ETS system:

1—Purchase

By using the remote control, a subscriber can view the products on the panel of the TV and they are able to purchase that product.

2—Polling/Voting

By using the remote control, a subscriber can vote for a particular event that is shown on the TV.

3—Request/Download Information

By using the remote control, a subscriber can request any particular information. They can also request an information download of specific software.

4—View Transaction History

By using the remote control, a subscriber can view their past transaction history on the TV panel. These transactions can be a type of confirmed, unconfirmed and wish list items.

The ETS System provides the following features:
  Subscriber is able to interact with the TV using the special remote control to request downloads, purchase products and vote.
  Subscriber is able to view order history, download products and buy wish list items and promotional items using a web browser.
  Administrator/Subscriber/Vendor is able to login into the system using a web browser.
  Vendor is able to create their own events on the system and add products associated with those events.
  Vendor is able to interpret the reporting details mentioned on the portal.
  Vendor is also able to maintain and keep track of all the events they prepared and scheduled to run on the television.
  Administrator is able to understand the transactions in the system.
  Administrator has the ability to manipulate the orders using the provided portal and tools.
  Administrators can update and maintain user data, product data and order data within the system.

Typically, when viewer interaction is possible, an icon (called an iBug) will appear on the screen (usually in the lower right-hand corner). At that point, the viewer will be able to press a button on the remote control that would bring up a menu that is specific to the currently viewed channel. By contrast, the GUIDE button brings up a universal guide no matter what channel is being viewed.

DETAILED DESCRIPTION OF THE INVENTION

The Present Invention allows a TV viewer to use a television remote control to interact with programming content broadcast by a subscription service provider such as cable television service, satellite service provided through a receiving antenna, cellular telephone service, and internet. The TV viewer can purchase a product, vote on an event (e.g., for a contestant on American Idol), request information, or download photographs, audio recordings, ring tones, software, games, and software applications—all using the buttons on the remote control.

The Present Invention allows a TV viewer to interact with the broadcast content using a remote control by associating event identification information with the content. The event identification information, in the form of data, is embedded in the content signals. The event identification data associates the content with an ability for the TV viewer to perform interactive tasks associated with the event by using the remote control. The viewer can purchase a DVD of a documentary while it is being broadcast. The viewer can purchase a product associated with the programming. There is no longer a need to dial a toll free number and to provide a credit card to make the purchase. The credit card information for a particular viewer is already on file with the service provider. When a viewer votes during particular programs, some voting is free of charge, and some voting incurs a charge. For example, voting on American Idol is currently performed by sending a text message on a cellular telephone. The user is charged for the text message. American Idol and the telephone service provider share the revenues from text message charges.

After the event identification data becomes associated with the content, at certain periods during the broadcast, a display indicator becomes visible on the screen. For example, the Discovery Channel might have a small circle with the letter "D" circumscribed therein. The display indicator is a signal that the viewer is able to interact with the programming. When the viewer sees the display indicator (and only when the viewer sees it) can be perform the interactive tasks. The viewer interacts with the broadcast content by pressing buttons on the remote control. The keystrokes are then transmitted to the set-top box. In a two-way conversation between the set-top box and the service provider, the keystroke information is sent to the service provider which starts a transaction, the service provider transmits a response back to the set-top box, and the response is displayed to the viewer in an intelligent fashion. A series of two-way communications between the viewer and the service provider collects data to iteratively form a transaction by concatenating all the data together.

Figure 1:
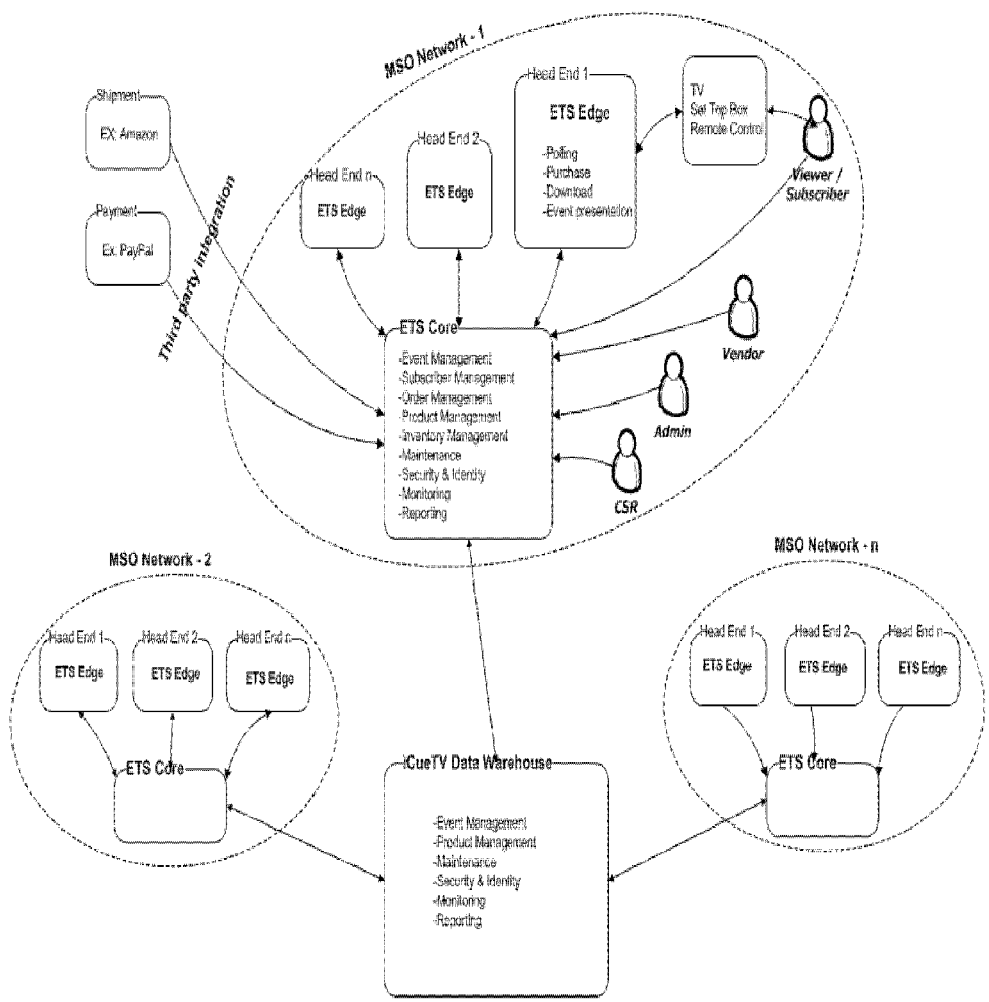
FIG. 1 ETS Conceptual Model—a high level overview of the system.

FIG. 1 is a conceptual model which gives a high-level overview of the system. In a typical production scenario, there will be multiple MSO's and one ETS Core system. These MSO's will be geographically located and every MSO will have one ETS Edge. A TV viewer interacts with the set top box application using a remote control. The user data flows from the Set Top Box Application to the ETS Edge, and then the data flows to the ETS Core system. When an event is created in the ETS Core system, the event data flows to the ETS Edge and then to the Set Top Box Application.

Every MSO will have multiple ETS Edge systems that are geographically located on its head ends. In addition to multiple ETS Edges, every MSO will have one ETS Core system that is centrally located within that MSO. The data from multiple ETS Core systems will go to the Data Warehouse on regular basis for persistent storage and reporting purposes.

The ETS Core controls:
1. event management;
2. subscriber management;
3. order management;
4. product management;
5. memory management;
6. inventory management;
7. maintenance;
8. security and identity;
9. monitoring; and
10. reporting.

The ETS Core communicates directly with the Data Warehouse which stores information regarding:
1. event management;
2. product management;
3. maintenance;
4. security and identity;
5. monitoring; and
6. reporting.

Third party vendors and shippers (e.g., Amazon) and payment processors (e.g., PayPal) communicate directly with the ETS Core through an MSO network, as do administrators (Admin) and customer service representatives (CSR). Each MSO network has a plurality of ETS Edge interfaces which provided geographically local viewer polling, purchasing, downloading, and event presentation.

Figure 2:
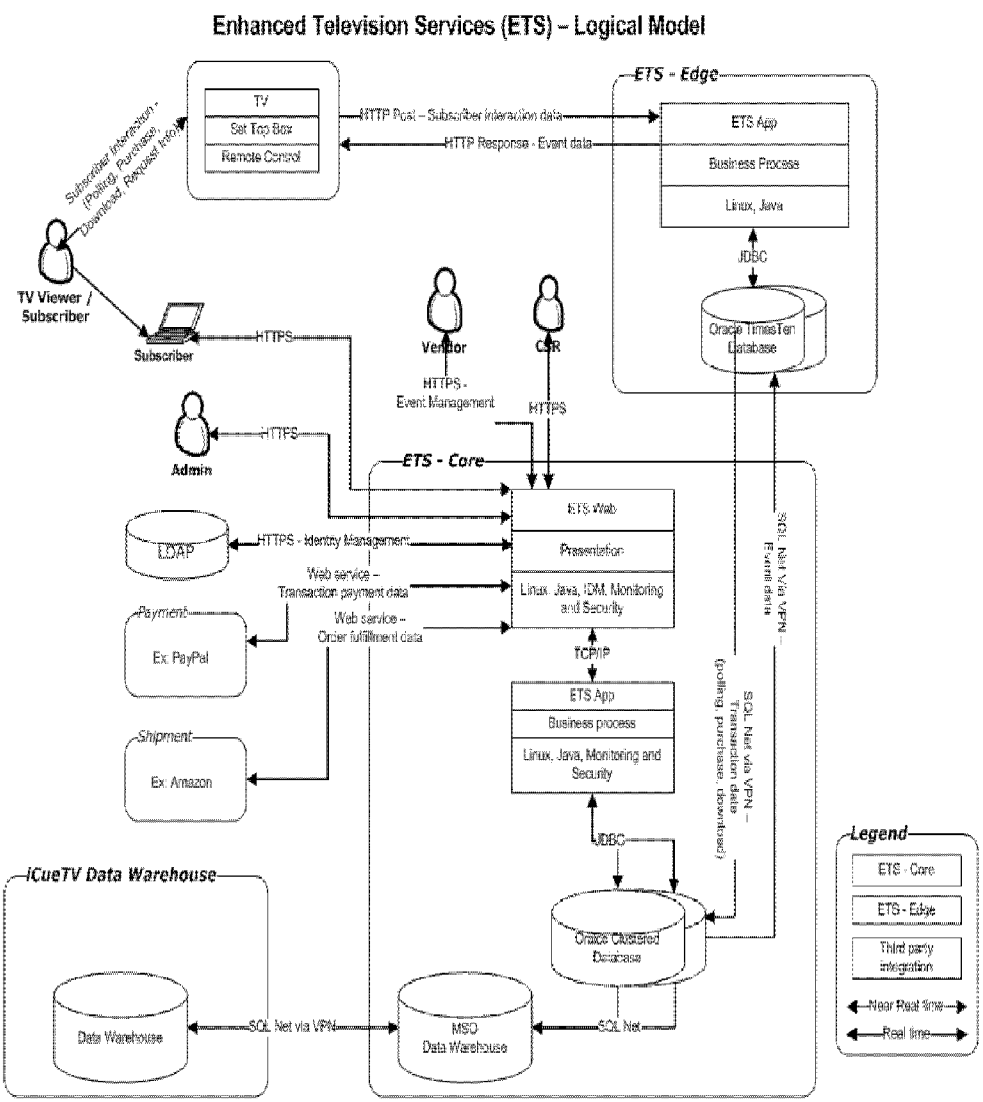
FIG. 2 ETS Logical Model
FIG. 3 ETS Edge Conceptual Model FIG. 4 ETS Edge Logical Model
FIG. 5 ETS Core Components
FIG. 6 ETS Physical Model
FIG. 7 ETS Edge System Hierarchy Chart using HIPO
FIG. 8 Module 1.0 IPO Chart—Entry Point—Process All Requests
FIG. 9 Module 1.0 Extended Description
FIG. 10 Module 1.0 high-level program flow chart
FIG. 11 Module 2.0 IPO Chart—Process Purchase Order
FIG. 12 Module 2.0 Extended Description
FIG. 13 Module 2.0 high-level program flow chart
FIG. 14 Module 3.0 IPO Chart—Process Download
FIG. 15 Module 3.0 Extended Description
FIG. 16 Module 3.0 high-level program flow chart
FIG. 17 Module 4.0 IPO Chart—Process Polling/Voting
FIG. 18 Module 4.0 Extended Description
FIG. 19 Module 4.0 high-level program flow chart
FIG. 20 Module 5.0 IPO Chart—Process Request Info
FIG. 21 Module 5.0 Extended Description
FIG. 22 Module 5.0 high-level program flow chart
FIG. 23 Module 6.0 IPO Chart—Process Authentication
FIG. 24 Module 6.0 Extended Description
FIG. 25 Module 6.0 high-level program flow chart
FIG. 26 Module 7.0 IPO Chart—Process Transaction History
FIG. 27 Module 7.0 Extended Description
FIG. 28 Module 7.0 high-level program flow chart

FIG. 2 is a logical model of the ETS system. It provides details about:
1. different tiers of the ETS system;
2. protocols used for communication;
3. data flow between the systems;
4. different types of users of the system; and
5. third party systems integration.

Whenever the subscriber interacts with the TV, he or she interacts using the Set-top Box (STB) that is associated with that TV. The customized application (Xlet) that is sitting on the STB will listen to these user interactions. The Xlet application will send the relevant requested data to the ETS Edge system and the ETS Edge will respond back to the Xlet. This transaction data will eventually go from ETS Edge to ETS Core system in real time or near real time basis. The ETS Core system will process the actual transaction. In the same way, when an event is created in the ETS Core system, that event data will be distributed to the relevant ETS Edges. When an ETS Edge receives a request from the TV subscriber, the relevant event data will be sent back to the Xlet in the form of the response.

ETS Edge

Figure 3:
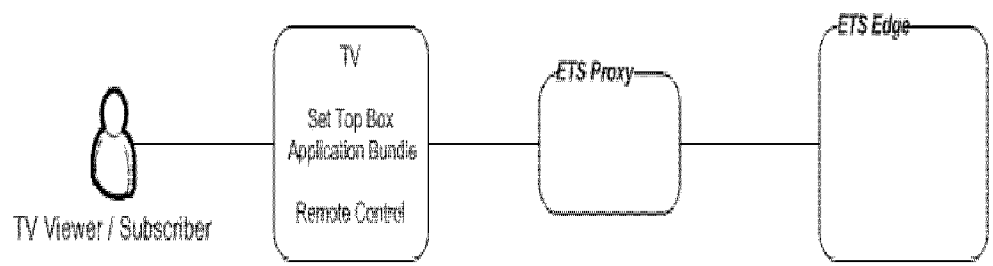
Figure 4:
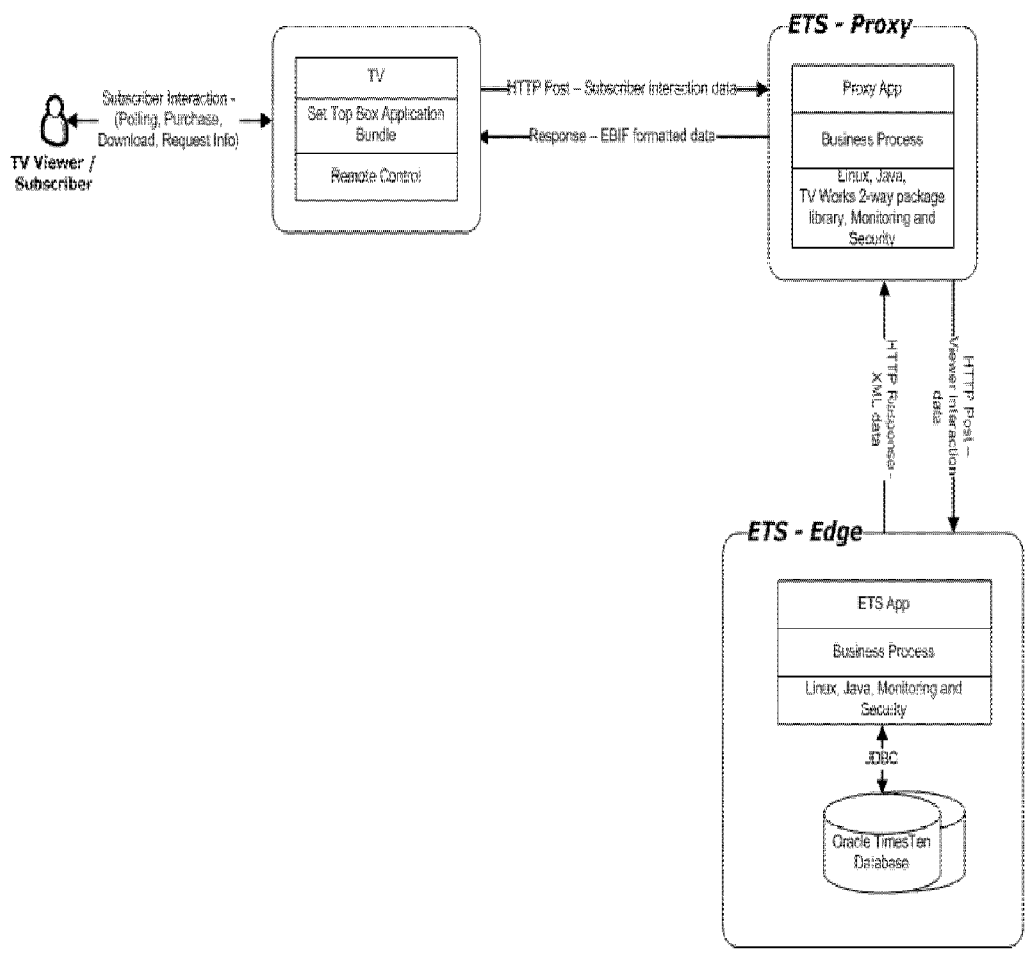

FIG. 3 provides a conceptual model that gives a high level overview of the ETS Edge system. The scope of ETS Edge system consists of the following sub-systems:
1. Set-top Application bundle (Xlet application)
2. ETS Proxy system
3. ETS Edge system FIG. 4 shows a logical model of the ETS Edge. The TV subscriber interacts with the set-top box using the remote control. The set-top application bundle (Xlet) that is sitting on the set-top box listens to those user interactions and sends the user requested data to the ETS Proxy and ETS Proxy sends the same request to the ETS Edge. ETS Edge responds back to the ETS Proxy in the form of XML. The proxy converts the XML into EBIF format data by using TV works 2-way package library. The converted EBIF data is sent back to the Xlet as a response and Xlet sends this dynamic data to the TV so the user can view the dynamic data on the TV as a response to their request.

Though the TV subscriber gets the response from the ETS Edge, the actual order processing will be done by the ETS Core system. The transaction data goes from ETS Edge to the ETS Core in real time (Ex: live polling) or near real time (download, request info) basis as per the configuration settings. The back and forth data transmission between ETS Edge and ETS Core is being taken care of by Oracle Times-Ten caching mechanism. The TimesTen gives high performance and scalability at an exceptional level.

User Definitions and Characteristics

Parent:

Main Account holder.

Has a PHONE number and TV PIN associated in the database.

Has the billing, email and physical address associations in the database.

Has a Username and Password for the Subscriber Portal.

Allows/denies access to the child account via the Subscriber Portal and sets transaction limits to each of the child accounts.

Child:

Authorized user account by the Parent account.

Has permission set by the Parent account (enabled/disabled; transaction limits; etc.)

Any wish list items added by the child account go to Parent account.

Unregistered user:

An unregistered user is one who never registered with the portal and tries to purchase using remote control.

The following requirements apply for an unregistered user:

Allow them to add a product into a PENDING BUCKET with a VALID PHONE number. Phone number will not be validated as valid or invalid. If the phone number is already in use, they will be asked to enter a different phone number.

Ask them to register on the portal with the same phone that they entered during their purchase attempt Once they register with the portal, the system will move the order from the PENDING BUCKET to their WISH LIST, present the WISH LIST for confirmation, and process the WISH LIST upon confirmation Registered User:

A registered user is one who already registered with the portal and makes a purchase using their remote control.

The following requirements apply for a registered user:

Allow them to purchase a product with a VALID PHONE NUMBER and PIN to complete the purchase If he enters a VALID PHONE NUMBER/WRONG PIN:
If the number of attempts are within the limit, they will again be requested to enter their PHONE NUMBER and PIN.
If the number of attempts exceed the limit, the system will respond to the user with a message as 'Wrong PIN entered. Please call customer support'.

If they enter a INVALID PHONE NUMBER/PIN, blackout the MAC and ask them to call customer support.

If the user is a child and they try to purchase something beyond allowed transaction limit, then the product will be added to their parent's WISH LIST.

MAC ID will not be verified as part of authentication, however it will be checked as whether it is in blackout list or not.

If the user himself wishes to add something into the wish list, allow him to do the same.

| SOFTWARE USED | |
|---|---|
| Set-top Box Application | Xlet application written in Java Micro Edition/Java thin client |
| ETS Proxy | Apache tomcat with deployed web application, TV works 2-way package library |
| ETS Edge | Tomcat Web Server, Java, Ofbiz, Oracle TimesTen |

Hardware Used

The staging environment is configured as such:

CentOS(RHEL) version 5.1 64-bit is running with a custom compiled kernel 2.6.25.2

There are FOUR servers setup in a semi-cluster array.

The specifications of each individual blade server are as follows.

Dual Xeon 2.33 GHZ Woodcrest

8 GB Memory

146 GB SCSI Drive in Redundant RAID array

Server one is the Core, server two is the Core DB server.

Server three is the Edge, server four is the Edge DB server.

ETS-Edge Business Requirements

The business requirements for this system can be given in two categories:

Functional Requirements:

The following basic functional requirements needs to be provided by the ETS Edge system.

1—Purchase

The subscriber should be able to purchase the products that are shown in the panel on the TV.

2—Download

The system needs to provide a feature where the subscriber should be able to download information that is interesting to them.

3—Polling

The system should provide a feature where the subscriber should be able to vote for a specific event.

4—Event Loading

The ETS Edge should load the event data to the STB based on the request received from the STB.

When the user interacts with the STB using the remote control, the STB Application will identify the current event that is associated with the current TV show the user is watching. Then, the STB Application will send a request to the Edge server to get the current event data. Edge Server will send the event data back to the STB Application so that the User can view the current event information on the TV panel.

These functional requirements are detailed below:

The Edge ETS shall respond to the Panel event request from set-top boxes with an appropriate XML object to display the result.

The Edge ETS shall process polling data received from STB applications.

The Edge ETS shall create two polling transactions, one for the total of polled votes on this ETS and one transaction to complete the billing for the polling.

The Edge ETS shall generate an appropriate transaction when product purchase request is completed from a STB.

The Edge ETS shall verify users according to a matching pin and email associated with an account before allowing a product purchase to be completed.

The Edge ETS shall allow a user with an invalid pin to either save the transaction to the wish list or to cancel the transaction.

The Edge ETS shall respond to a request for additional information about a product (Request Info ex. PDF brochure) by displaying additional data to the user through the STB.

The Edge ETS shall respond to a request for additional information about a product (Request Info ex. PDF brochure) by creating a transaction that informs the Core ETS to send an email with additional information.

The Edge ETS shall be able to complete transactions that involve digital downloads (ex. mp3's, pictures, ETC).

The Edge ETS shall create and save a transaction indicating that a product is on a "wish list".

The Edge ETS shall allow the user to view their wish list.

The Edge ETS shall check the polling permissions of a user before accepting the vote.

The Edge ETS shall verify that the MAC address of a STB has not been blacklisted and if it has shall block the transaction and display an error.

The Edge ETS shall allow the user to view a transaction history which displays a configurable number of past transactions.

The Edge ETS shall remember a user associated with a MAC address if the user requests it (OCAP only).

The Edge ETS shall only prompt the user for a pin if the user indicated that they should be remembered.

The Edge ETS shall clear remembered users on a periodic schedule.

The Edge ETS shall allow a new user to start a transaction through a STB using their phone number.

The Edge ETS shall save session information until either a configurable time has passed or the user completes a transaction.

Non Functional Requirements:

The following non functional requirements needs to be addressed by the system:

1—Availability

The Edge ETS shall respond to every request within 1 second.

The Edge ETS shall save all transactional information related to the subscriber actions to the database.

ICD—Each request to the Edge shall contain a tag indicating the transaction type (product sale, polling, Information request, digital download).

The Edge ETS shall record transactions to a database that replicates the data to the core ETS in a lossless manner.

The design of the Edge ETS shall support a minimum 50 k and a maximum of 500 k subscribers per Edge.

The Edge ETS shall be able to respond to a maximum of 200 k transactions over a 10 second period, with a transaction mix of (80% polls, 5% Product purchases, 10% information request and 5% digital downloads).

Highest ever household viewership was 60% of households watching.

The Edge ETS shall be able to continue serving users if the link between the core and edge is interrupted.

2—Stability

The Edge ETS shall have redundancy to support 24×7 Uptime.

The Edge ETS shall, depending on desired topology, support failover to an alternate server.

The Edge ETS shall log data pertaining to its performance. Transactions handled, processor load etc.

The Edge ETS shall log all administrative activities.

ETS Core

Figure 5:
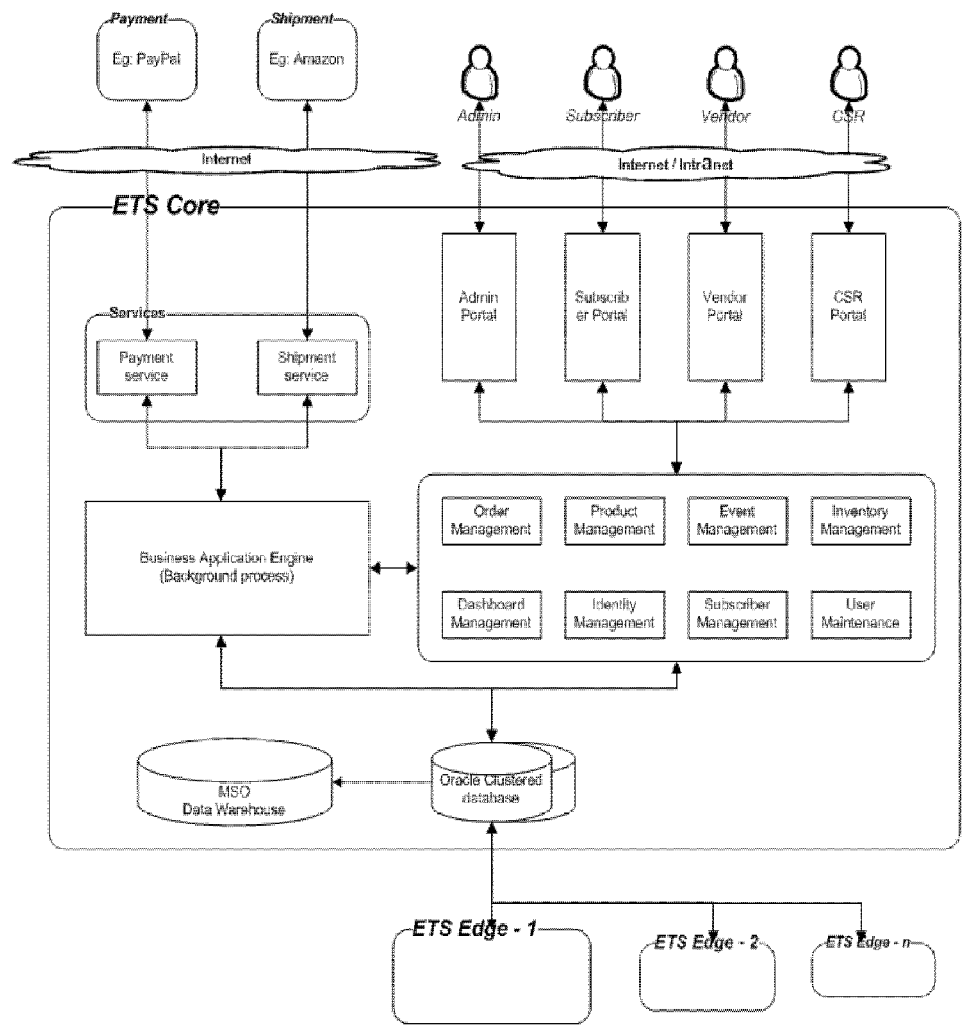

FIG. 5 shows the components of the ETS Core. The ETS Core system will contain the following components:

Web Portals

Business Application Engine

Common Business Services

Third Party Integration Services

Web Portals

The ETS Core system will have the following web portals:

Administrator Portal

Administrator portal gives the complete ability for the administrator of the system. To add/remove new users manually, add/remove products manually, check out the detailed transactions. Manipulate the transactions etc. CSR staff will have the role to act as administrators for the complete systems. Administrator can also assign privileges to different users of the system.

Subscriber Portal

Subscriber portal is the place where the user is able to manage their orders and wish list. It also displays products to the user based on user interests in hot deals page. The User can check their activity history on timely basis. User can also download the products based on the requests they made on the TV.

Vendor Portal

Vendor Portal allows vendors/advertisers to define events that are going to be displayed on TV when the commercial or program is broadcasted. Vendor portal also has reporting ability. The reporting includes, but not limited to events, products and geographical region. Vendor Portal allows vendors to add products (electronic or physical) and update existing vendor created products.

CSR Portal

The CSR portal will be used by the CSR to support the customers.

Business Application Engine

Business Application Engine comprises the logic to process the User requests and automate transaction processing. It inserts the order into the core system and applies business logic into it. It contacts the payment gateway to charge the user for the amount of the product (if it is a product sale). All successful transactions will be forwarded to an internal or third party fulfillment center. The confirmation of the transaction will be sent from the third party billing and fulfillment systems. Product sale, download request and voting are all handled as a part of this subsystem.

Common Business Services

Common Business Services can be accessible from any portal and includes the following services:
  Order Management
  Product Management
  Event Management
  Inventory Management
  Dashboard Management
  Identity Management
  Subscriber Management
  User Maintenance
Third Party Integration Services
  These services are used to integrate with third party vendors and include the following:
  Datacenter Service
  Datacenter service will be used to send the aggregated polling data in real time to the broadcasting data center so that it can be sent to the event location such as a stadium to show the result on the stadium screen.
  Shipment Service
  Third party fulfillment service can be used for outsourcing fulfillment processing. System uses third party fulfillment web services to forward order details directly into their systems and the order will be fulfilled by third party and on subsequent requests will return the status of the order from third party fulfillment.
  Payment Service
  Payment processing and user detail verification uses PayPal service. PayPal service takes the user details and charges the method user requested after validating details given by the user. (Need to rewrite these and do it similar to the third party fulfillment)

| SOFTWARE USED | |
| --- | --- |
| The ETS Core system | Java, JSP, Ruby on Rails, PHP, Ofbiz, Tomcat Application server, Oracle clustered database |

Hardware Used
  The staging environment is configured as such:
  CentOS(RHEL) version 5.1 64-bit is running with a custom compiled kernel 2.6.25.2
  There are FOUR servers setup in a semi-cluster array.
  The specifications of each individual blade server are as follows.
  Dual Xeon 2.33 GHZ Woodcrest
  8 GB Memory
  146 GB SCSI Drive in Redundant RAID array
  Server one is the core, server two is the core DB server.
  Server three is the edge, server four is the edge DB server.
Core Business Requirements
  The business requirements for the ETS Core system can be detailed in two categories:
Functional Requirements:
  1) Third Party API
  A standard application programming interface that provides third-party developers the ability to utilize CORE services for order processing, billing and fulfillment. This is a programmatic (API) interface not a presentation layer interface so the system is capable of providing "hooks" into our system to process order generated by third-parties.
  2) Dashboard and Reports
  A standard and secure interface for vendor and partners to view their event performance and information in near real-time dashboard and be capable of generating ad-hoc reports views on the same data. Report generating metrics should be based on: Event ID, Product ID, Geography or DMA, Event Type (IR, Polling, Purchase, Digital), Event Coverage (National/Regional/Local), # of Transactions Completed, # of Transactions Canceled, # of Transactions Added to WISH LIST, # of Transactions (Volume), Transaction Price (Dollar Amount, Fee, Ad Sponsored, etc.), Transactions Frequency (per minute, hour, day, week, month, year, quarter, etc.), Transactions Payment Type (Visa, Amex, Discover, etc.), Transactions Denied (e.g. problem with payment, account blocked, etc.), Transaction Shipping Type (Overnight, Standard, Email, Cellular, etc.), By Vendor (Events, Transactions, Fulfillment Site, etc.), By MSO (Events, Transactions, etc.) Main or summary reporting should include: # of Transactions, Transaction Totals by MSO/Region, etc
  3) Product Management
  Product identification of images, group/party, pricing, multiple item discount, product (Good/Digital Good/Service), category, features, description, inventory, storage, supplier, fulfillment methods, fulfillment logic tiers—One to many (e.g. warehouse A, then B, then C), geography or DMA, availability period, status, SKU, ISBN, Catalog ID, UPC code, DMA or Region Deployment Requirements, etc.
  4) Background Processing
  Based on the event type and/or geographic location of MULTIPLE or SINGLE transactions, the CORE system needs to be capable of intelligently acting on those INCOMING requests and be capable of acting on them in a number of ways.
  5) Events and Event Panels
  Allow the creation of unique events and event panels to be displayed on TV via a web interface.
  A standard and secure interface for Vendor and Partners to create, manage, upload event and product data (bulk and per item).
  Allow the creation of unique events and event panels at the CORE that will be replicated out to the EDGE servers based on specific event and geographic criteria (e.g. Event Coverage—National/Regional/Local, Geography or DMA, etc.) to be displayed on TV via a web interface.
  Ability to distribute Event and Product data (iBug info) to different EDGE centers based on demand, region, time of day, etc.
  6) Wish List
  Ability to manage WISH LIST items (view/initiate order/checkout/remove) from the Portals (Admin, Subscriber and CSR).
  7) Data Warehouse
  Ability to feed all transaction data into a data warehousing system at the CORE. 24×7 uptime.
  8) Monitoring Management
  Proactive alert system tied to each process/service (e.g. Nagios for application monitoring, Management agents for hardware monitoring, Remote BIOS system level access to hardware.
  Ability to provide a management and administrative interface to the CORE system (Hardware/System/Software) from both internal (within/local to the CORE network) and external (outside/remote to the CORE network) access methods.
Portals Requirements:
  The ETS Core system will have the following web portals:
  1—Subscriber
  2—Vendor
  3—Admin
  4—CSR
  1) Subscriber
  Subscriber is a TV subscriber who registers their profile in ETS system. A standard, plug-able (into existing MSO subscriber portals) and secure interface for MSO subscribers to manage their subscriber accounts (opt-in/out of service, manage single or multiple profiles per household, passwords, security settings, payment methods, shipping preferences, loyalty accounts general interests for more targeted offers via portal, etc.)

The Subscriber portal will provide the following functionalities,

Register profile
If already registered, allow them to log into the system
View/edit user details
View/edit order details before being committed
View/edit Wish List details before being committed
Buy a featured item
Buy a wish list item 2) Vendor A standard and secure interface for vendor and partners to view their event performance and information in near real-time dashboard and be capable of generating ad-hoc reports to screen, email or document format (e.g. PDF, ODS, CSV, Tab-delimited, etc.) Report generating metrics should be based on: Event ID, Product ID, Geography or DMA, Event Type (IR, Polling, Purchase, Digital), Event Coverage (National/Regional/Local), # of Transactions Completed, # of Transactions Canceled, # of Transactions Added to WISHLIST, # of Transactions (Volume), Transaction Price (Dollar Amount, Fee, Ad Sponsored, etc.), Transactions Frequency (per minute, hour, day, week, month, year, quarter, etc.), Transactions Payment Type (Visa, Amex, Discover, etc.), Transactions Denied (e.g. problem with payment, account blocked, etc.), Transaction Shipping Type (Overnight, Standard, Email, Cellular, etc.), By Vendor (Events, Transactions, Fulfillment Site, etc.), By MSO (Events, Transactions, etc.) Main or summary reporting should include: # of Transactions, Transaction Totals by MSO/Region, etc.

Upload products (single/batch)
Create events
Receive a schedule/event id list
Check how each product is performing
Checks how each event is doing.
Deletes products
Assigns how do they accept payments
Assigns what are the different shipping methods available
Assigns local/remote warehouses to product fulfillment options
Upload digital goods to support local hosting
Upload Remote URLs for digital downloads
Chooses which geographical location this event should be played in.
Should be able to cancel the order in their warehouse
Should be able to access the warehouse data with applied rules 3) Admin A standard, plug-able (into existing MSO administration portals) secure interface for Customer Service Representatives (CSR's), Managers & Administrators to have access to an event, order, subscriber, product, inventory, maintenance, monitoring, reporting and security management ALL based on their job responsibilities and roles to limit system access.

Edit User details
Edit Order details anytime
Edit Wish list details anytime
Ability to commit all/some of the batched transactions
Ability to create Vendors
Monitors system performance
View/Edit Order/Transaction/Payment process progress

4) CSR

Allow CSR the ability to manage Subscriber orders (e.g. place orders on hold or cancel, change order payment method should a preferred payment method be denied, change shipping preferences—method/address. If an order has not been sent out for fulfillment and other ecommerce site CSR services, etc.) placed via the set-top box application or e-commerce shopping cart interface.

Log into the system with elevated rights to complete the tasks required
View/Edit User details
View/Edit Order details before/after being committed
View/Edit wish list details before/after being committed
Upload [batch of] Products
Edit/View Events
View schedule/Event ID list
Ability to check product availability/status
Request product deletions
View the different Vendor shipping methods available
View the Vendor local/remote warehouses for product fulfillment options
View/Edit digital goods to support local hosting
View/Edit Upload Remote URLs for digital downloads
View/Edit which geographical location this event should be played in.
Able to view/cancel the order in his warehouse
Able to view warehouse data with applied rules
View all the batched transactions not committed
View vendor details
Monitors system performance
View Order/Transaction/Payment process progress Non Functional Requirements:

The following non functional requirements needs to be addressed by the system,

1) Accessibility

Internal/External access (Intranet/Internet)
Manageability of the CORE system (Hardware/System/Software) from both internal (within/local to the CORE network) and external (outside/remote to the CORE network) access methods.

2) Security

Secure storage of sensitive information (user ID, passwords, credit cards, address, etc.) within EACH of the CORE system(s).

Roles based security (Admin, Vendor, Subscriber, CSR).
Role based security to all portals and resources.

Ability to secure ALL data exchange (receive and transmit) to the EDGE from the CORE with little effect on performance. VPN should be the standard unless secure transactions can be realized via other methods (secure database transactions, etc.)

Ability to secure ALL data exchange (receive and transmit) to external third-party entities (PayPal Payflow, Amazon, etc.)

3) Availability

The system requires 99.999% "Five nines" uptime requirement for the service.

| Total Downtime (HH:MM:SS) | | | |
| --- | --- | --- | --- |
| Availability | per day | per month | per year |
| 99.999% | 00:00:00.4 | 00:00:26 | 00:05:15 |

4) Manageability and Maintenance

Ease of use and system management

Ease of maintenance and expansion without affecting 100% uptime requirement

5) Scalability (User Base)

Ability to process an average of 250 k-500 k/sec transactions or requests from 1200-1500 EDGE sites 6) Audit Ability Ability to audit the transactions and comply with future financial regulations like Sarbanes-Oxley (audit capabilities on all record changes, report on every user who has access to any system and how they obtained that access, etc.).

Figure 6:
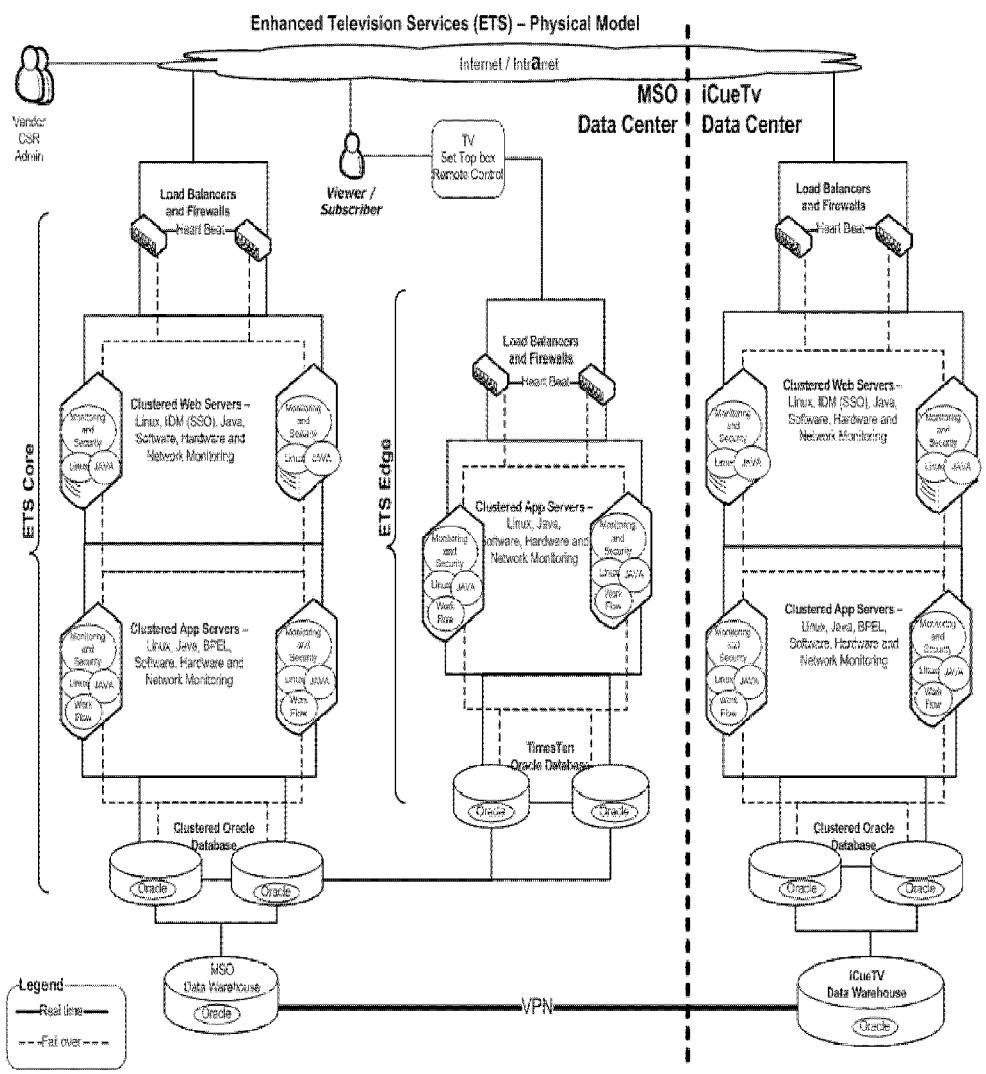

FIG. 6 shows a physical model of the ETS system. The physical model describes how the ETS Edge and ETS Core system are physically deployed into production. Load balancers distribute the traffic among web servers that are configured in the cluster. All servers are clustered so that when one specific server goes down, the counter part in the cluster will provide the service. So eventually the system will provide high availability and scalability.

FIGS. 7 through 28 are HIPO charts and high-level program flow charts for the ETS Edge system. HIPO was a diagrammatic documentation system for software developed by IBM. Information regarding this system can be found in IBM Publication GC20-1851-1 entitled: "HIPO—A Design Aid and Documentation Technique." It was originally designed to promote "structured programming." But, since the introduction of "object oriented programming," HIPO has fallen into disuse. Nonetheless, it is still an excellent tool for describing software systems. HIPO is an acronym that stands for Hierarchy plus Input, Process, Output. HIPO documentation comprises a series of diagram charts.

The first chart in each series is a hierarchy chart. This chart, appearing like a corporate organization chart, displays the calling relationship between the various system modules. Each module appears as a block in the diagram. Lines connect these modules to show their hierarchy. Hierarchy is further shown by assigning numeric labels to the modules. Normally, the highest order module would be labeled 1.0. Modules immediately below it hierarchically would be labeled 2.0, 3.0, 4.0, . . . , and so on. Modules hierarchically below 2.0 (for example) would be labeled 2.1, 2.2, 2.3, . . . , and so on. Modules hierarchically below 2.1 (for example) would be labeled 2.1.1, 2.1.2, 2.1.3, . . . and so on. So, by looking at the numeric label of any module, one can determine its level of hierarchy. A black triangle located at the corner of the module block indicates that the module is re-used many times either as a subroutine or as an object.

Following the hierarchy chart, each module depicted on that chart receives an IPO chart. The IPO chart is divided into three columns. The leftmost column represents INPUT. The rightmost column represents OUTPUT. The central column represents PROCESS. This is where the various steps in the process are described. Most of the information in the INPUT and OUTPUT columns is graphical (e.g., representing terminals, hard drives, printers, etc.). Most of the information in the PROCESS columns is descriptive text showing the procedural steps. Arrows connect the PROCESS column to the INPUT and OUTPUT columns to show data flow.

Each IPO chart may have an Extended Description showing notes about the various steps in the process. These act almost like footnotes in a document. They are usually too detailed or extraneous to include in the steps denoted in the PROCESS column.

Figure 7:
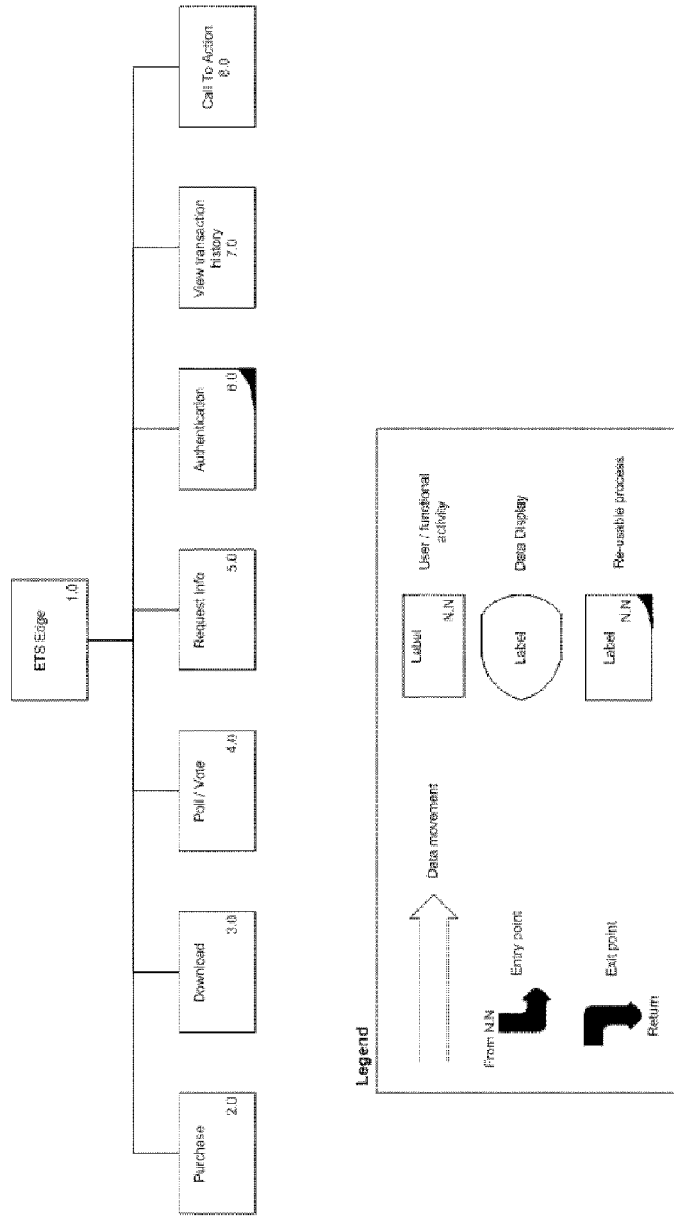
Figure 8:
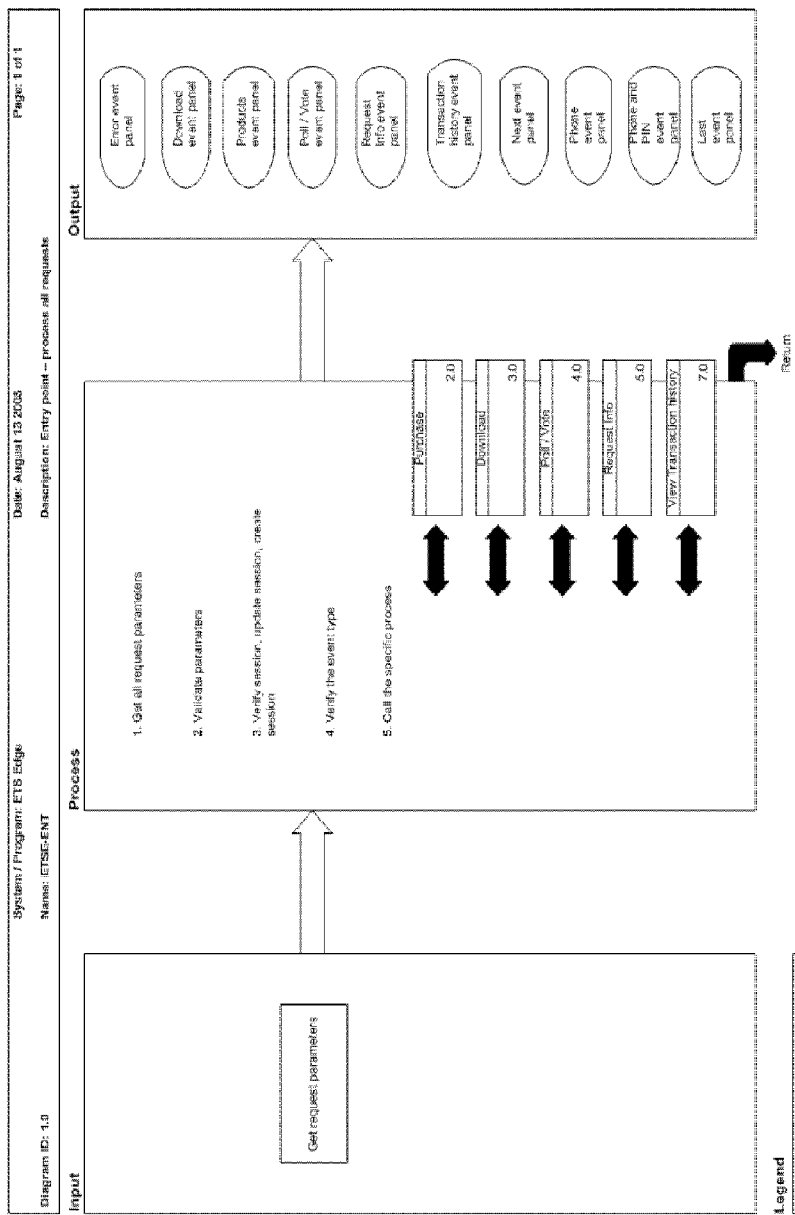
Figure 10:
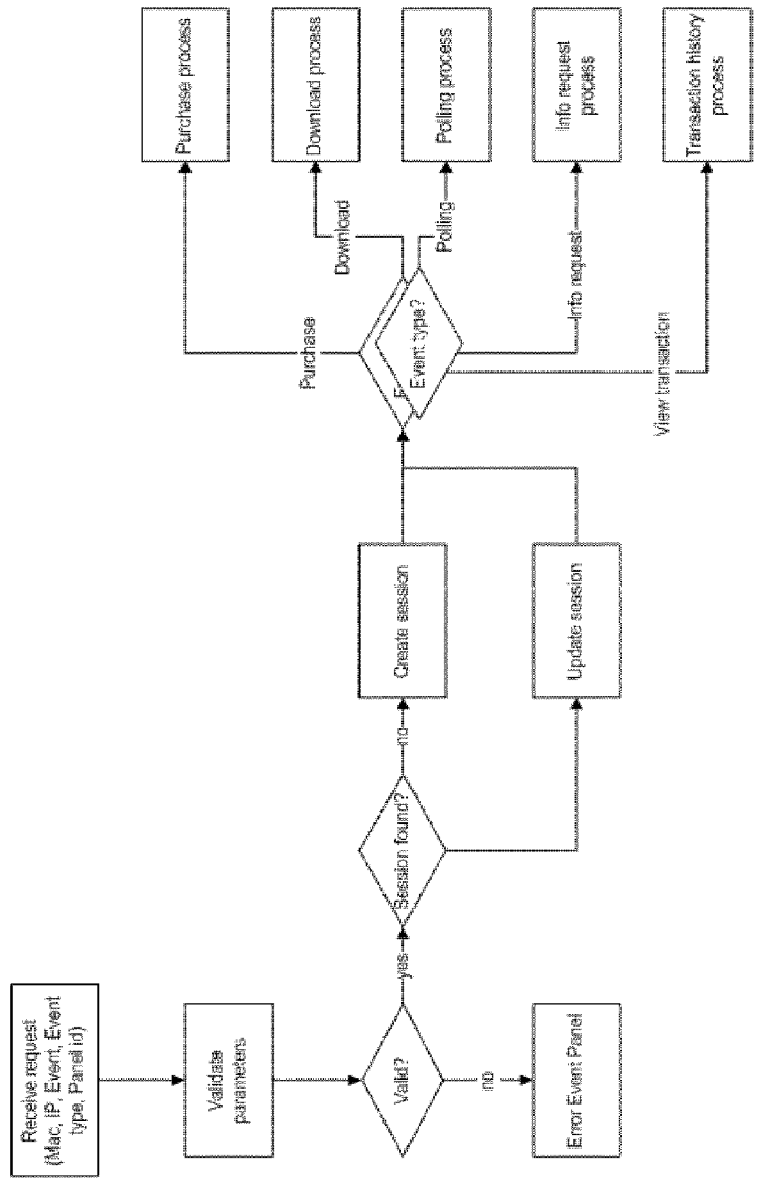
Figure 11:
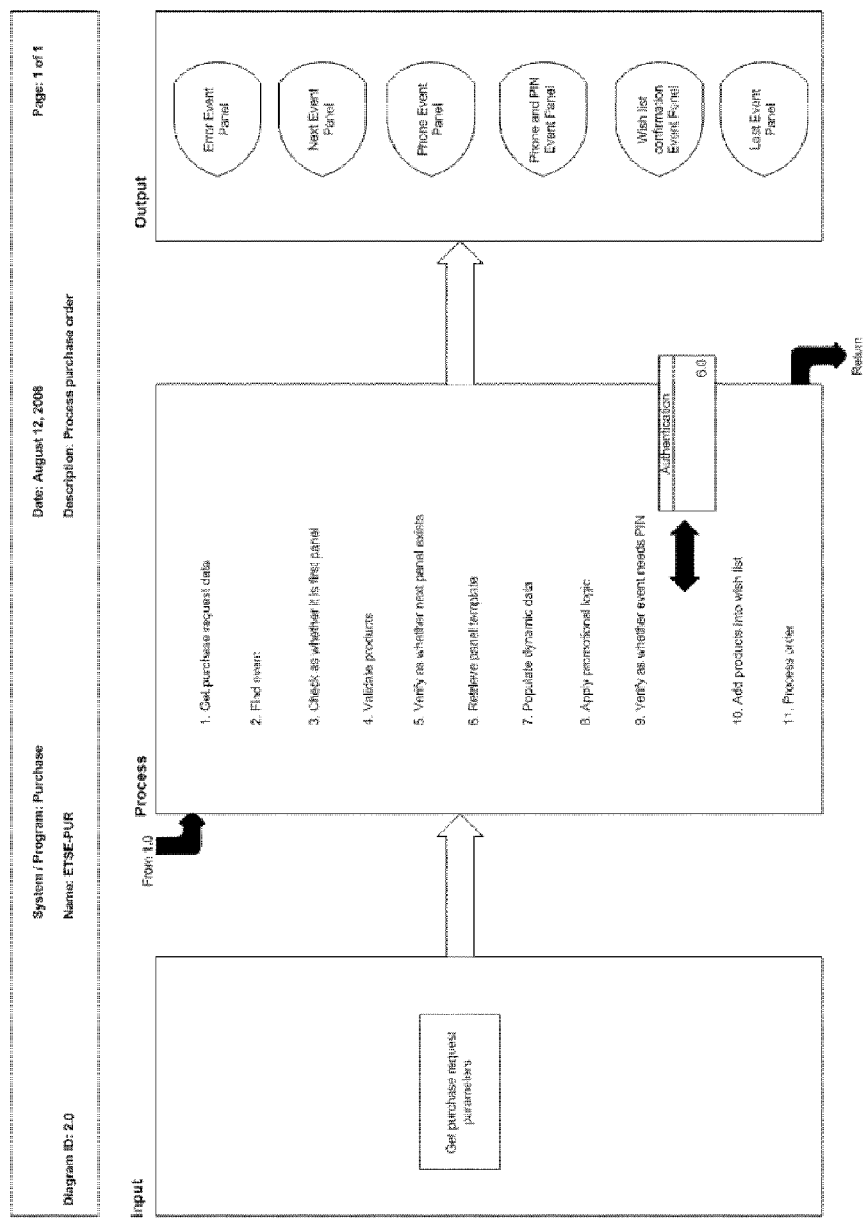
Figure 13:
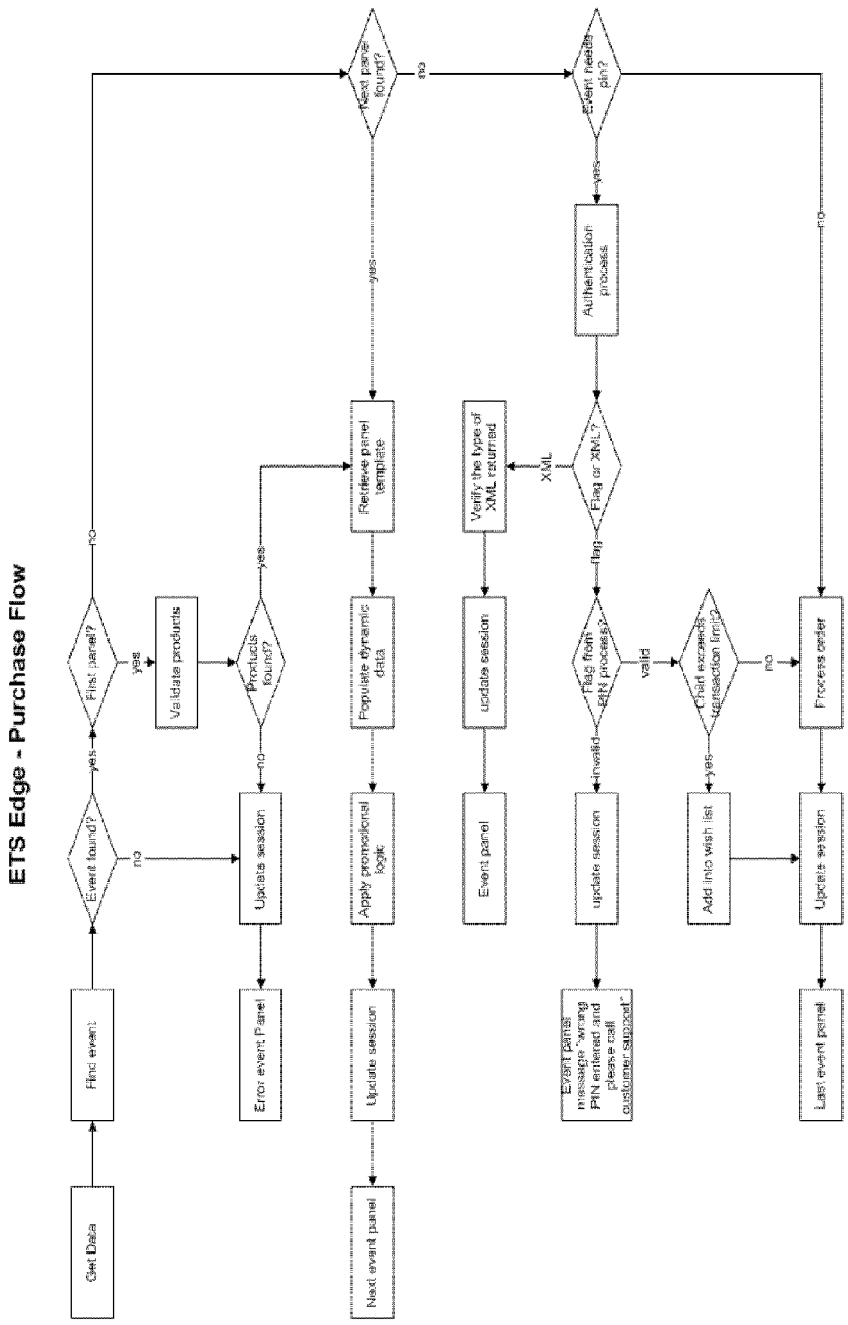
Figure 14:
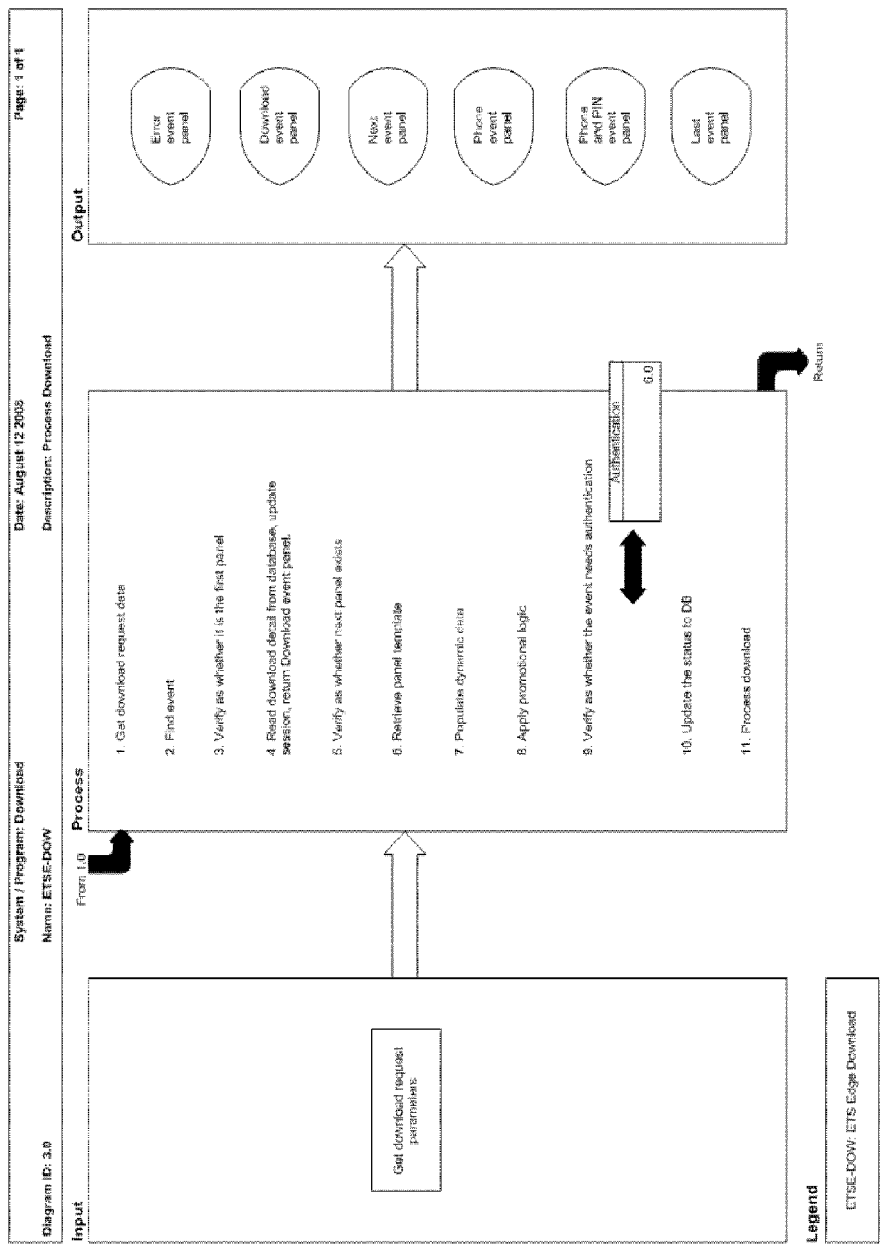
Figure 16:
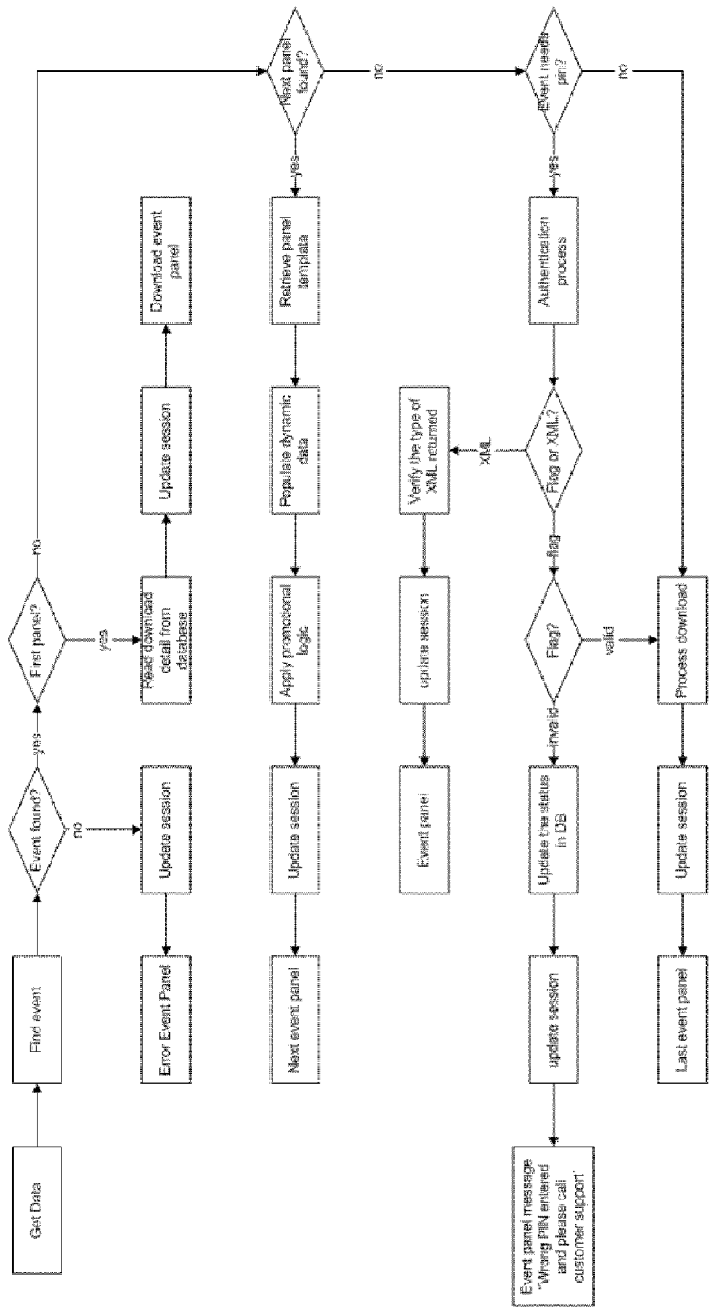
Figure 17:
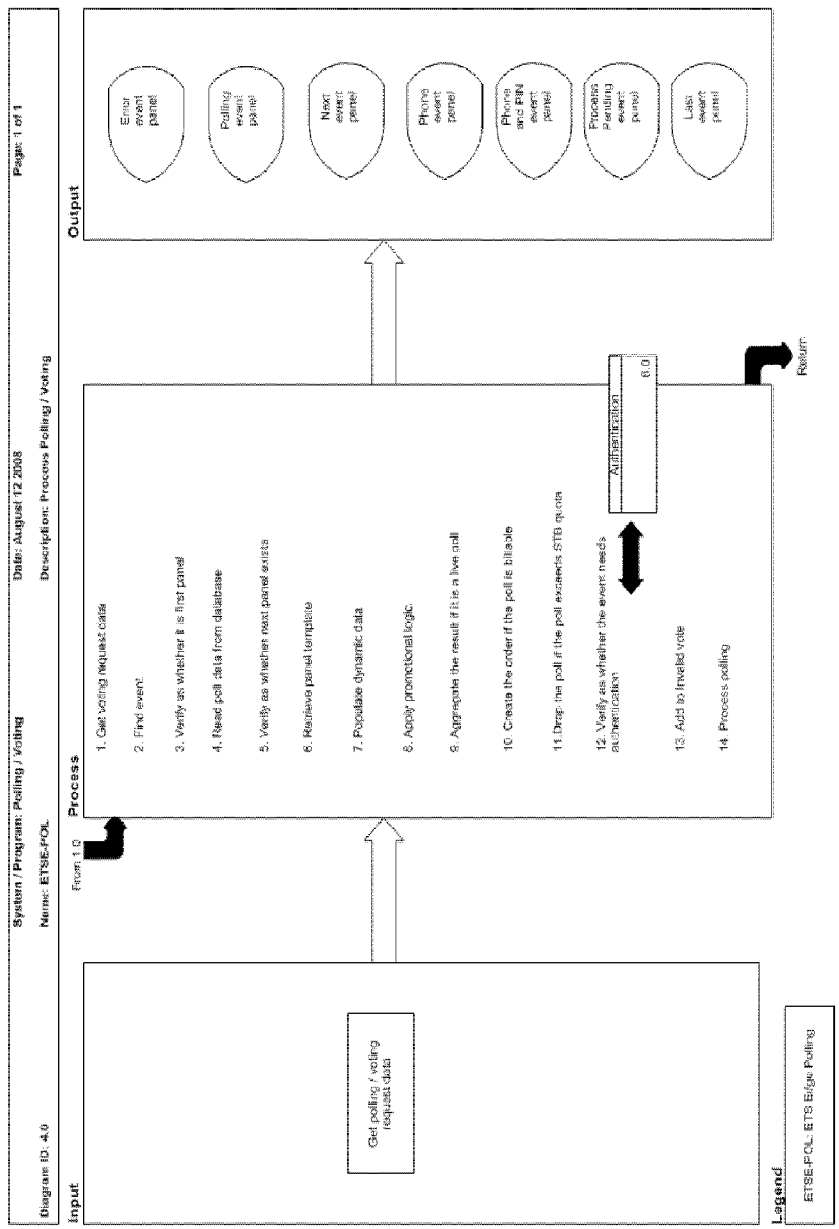
Figure 19:
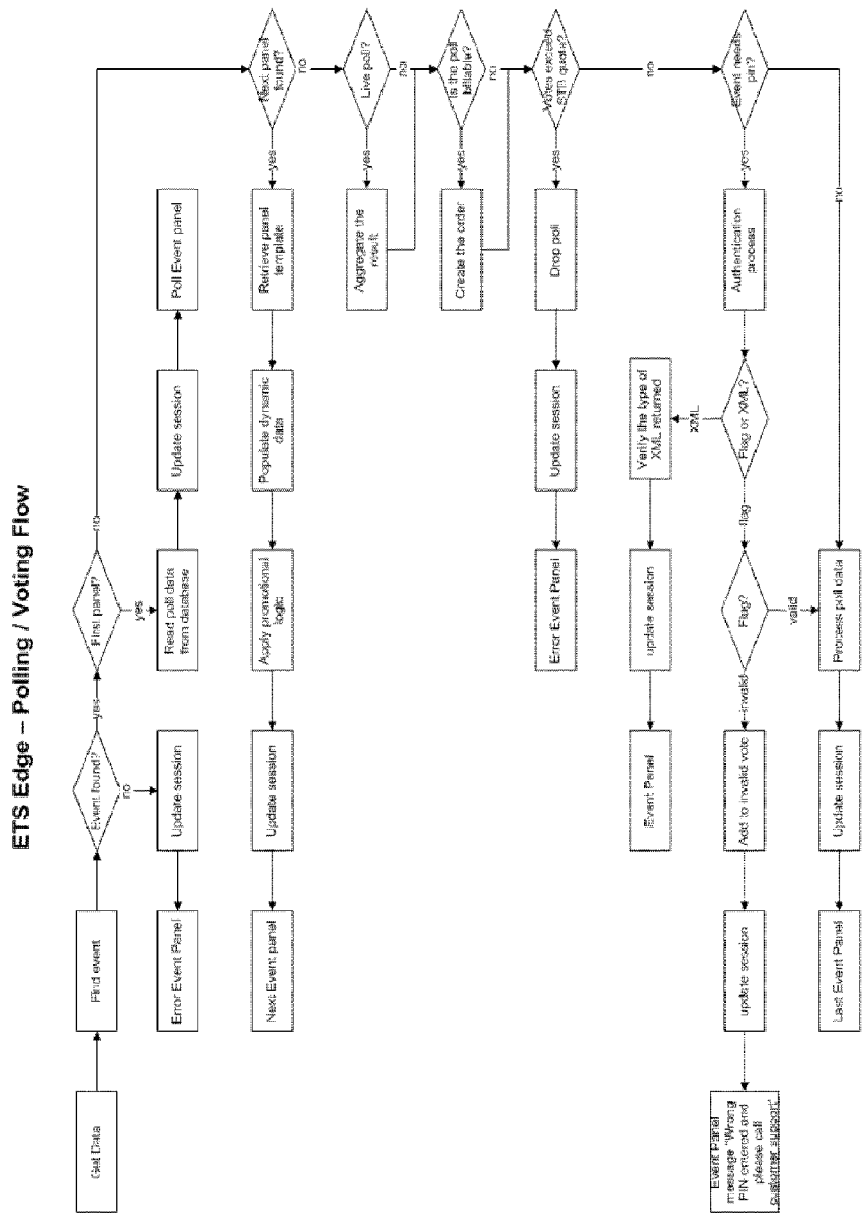
Figure 20:
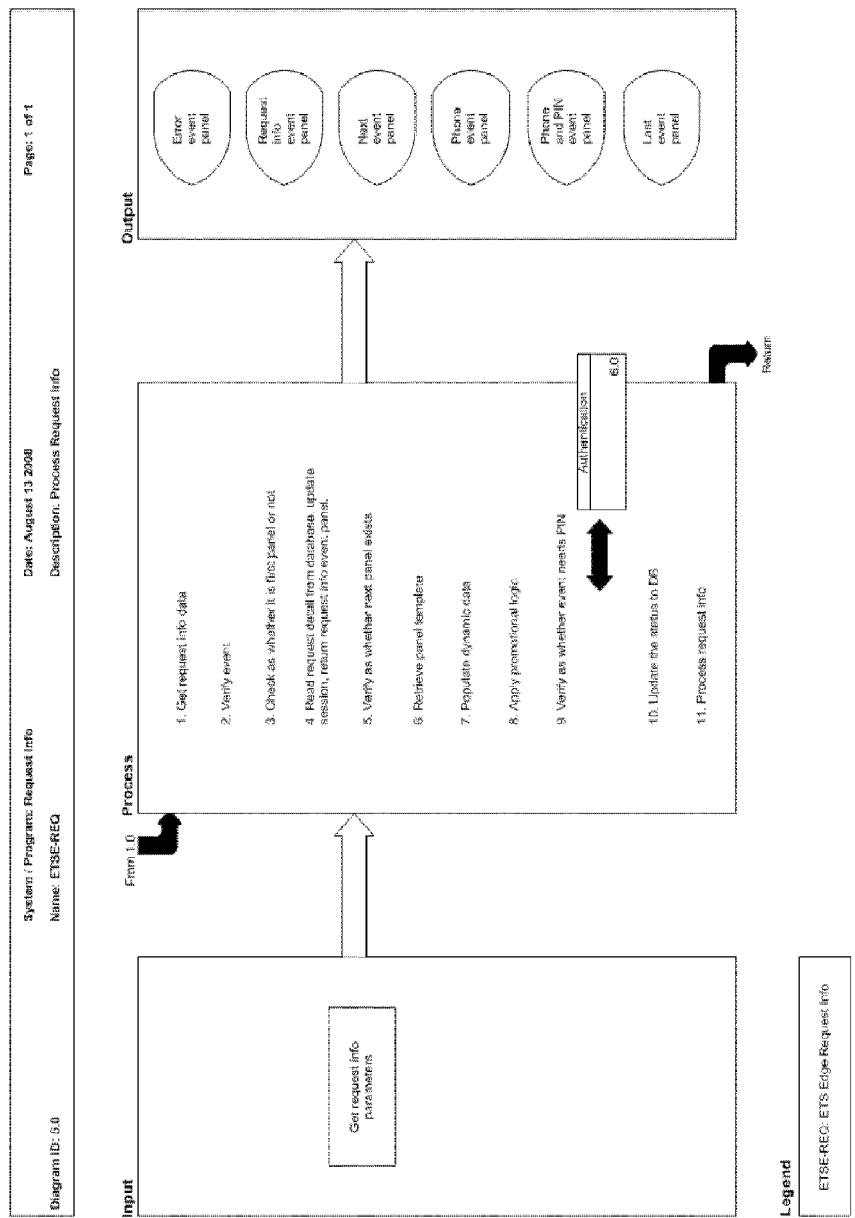
Figure 22:
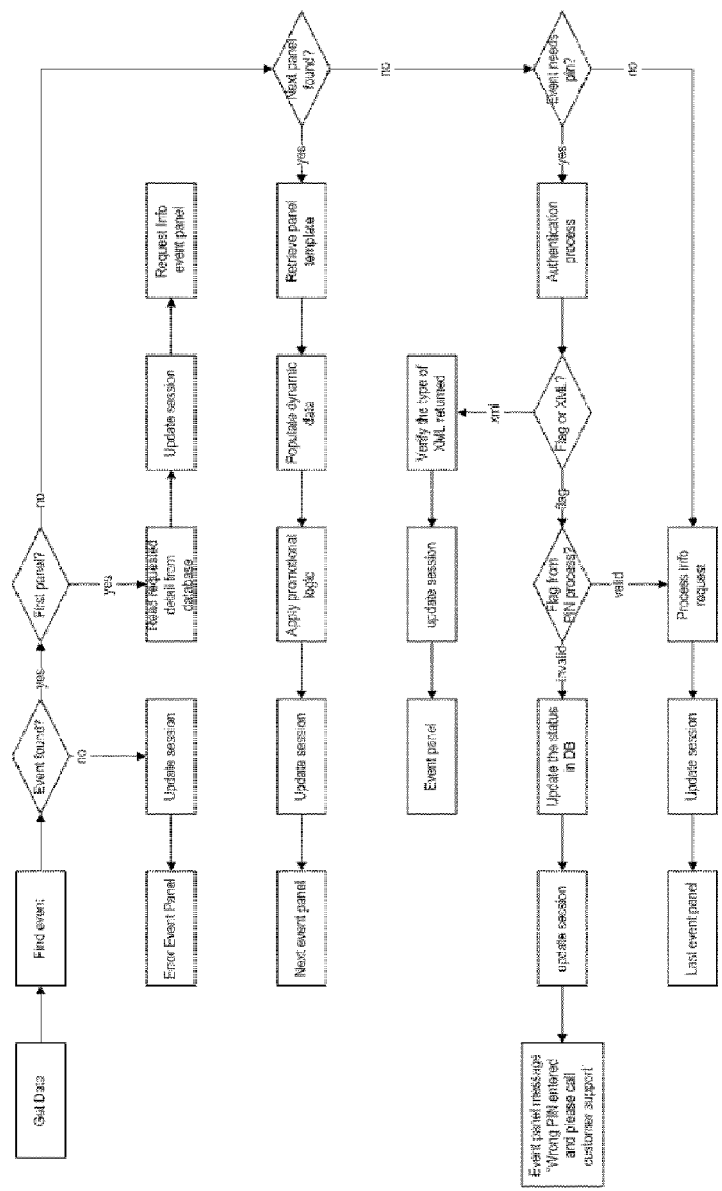
Figure 23:
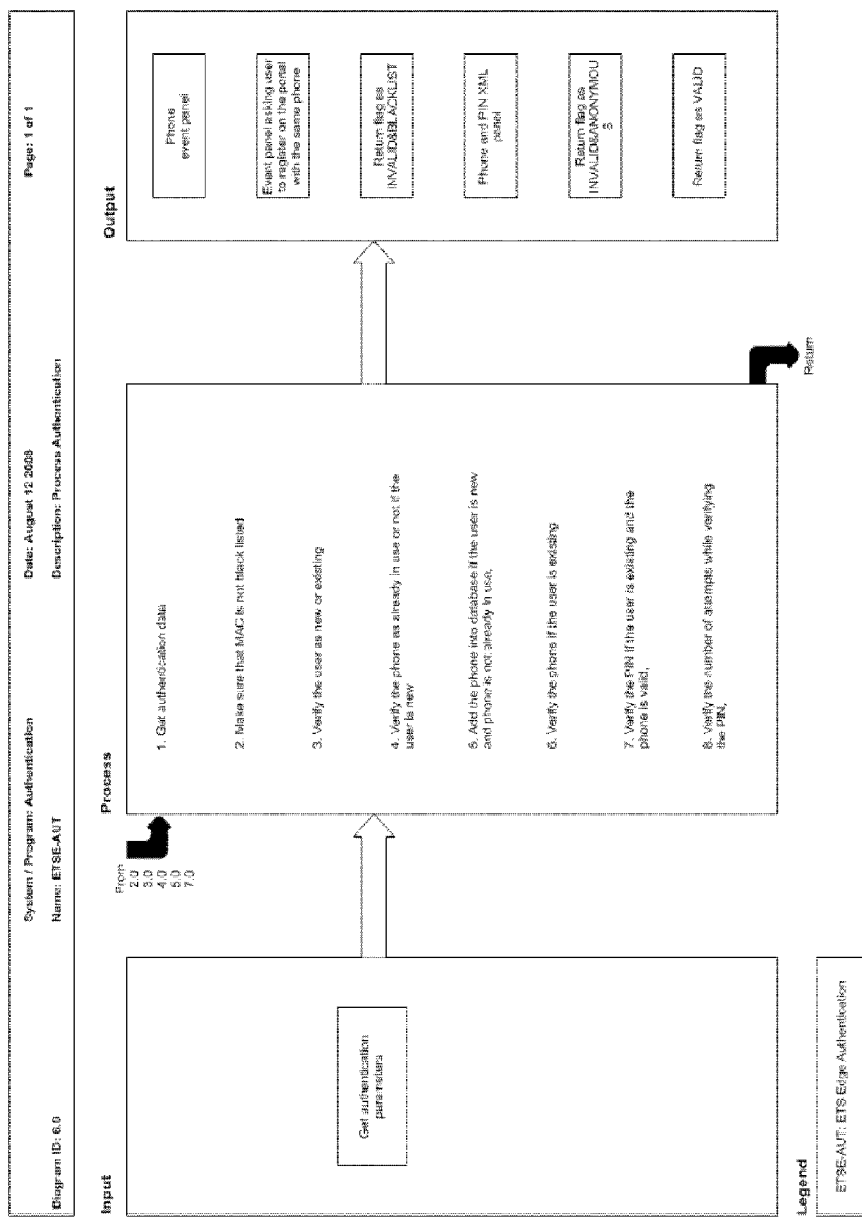
Figure 25:
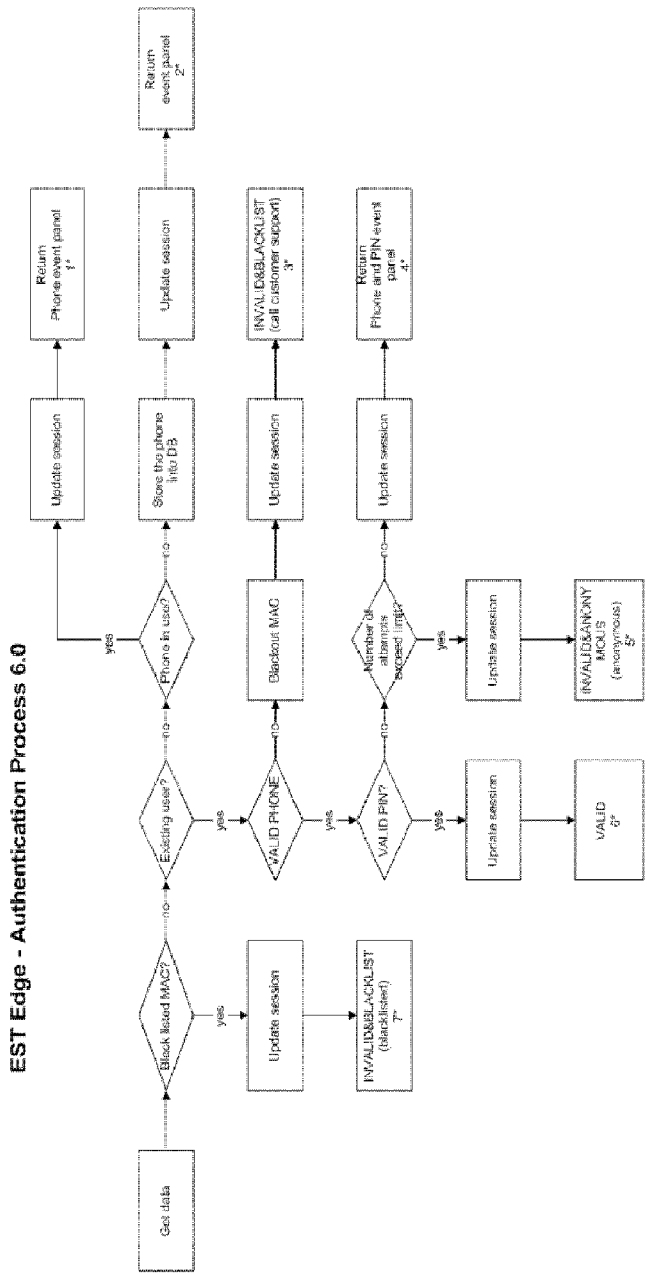
Figure 26:
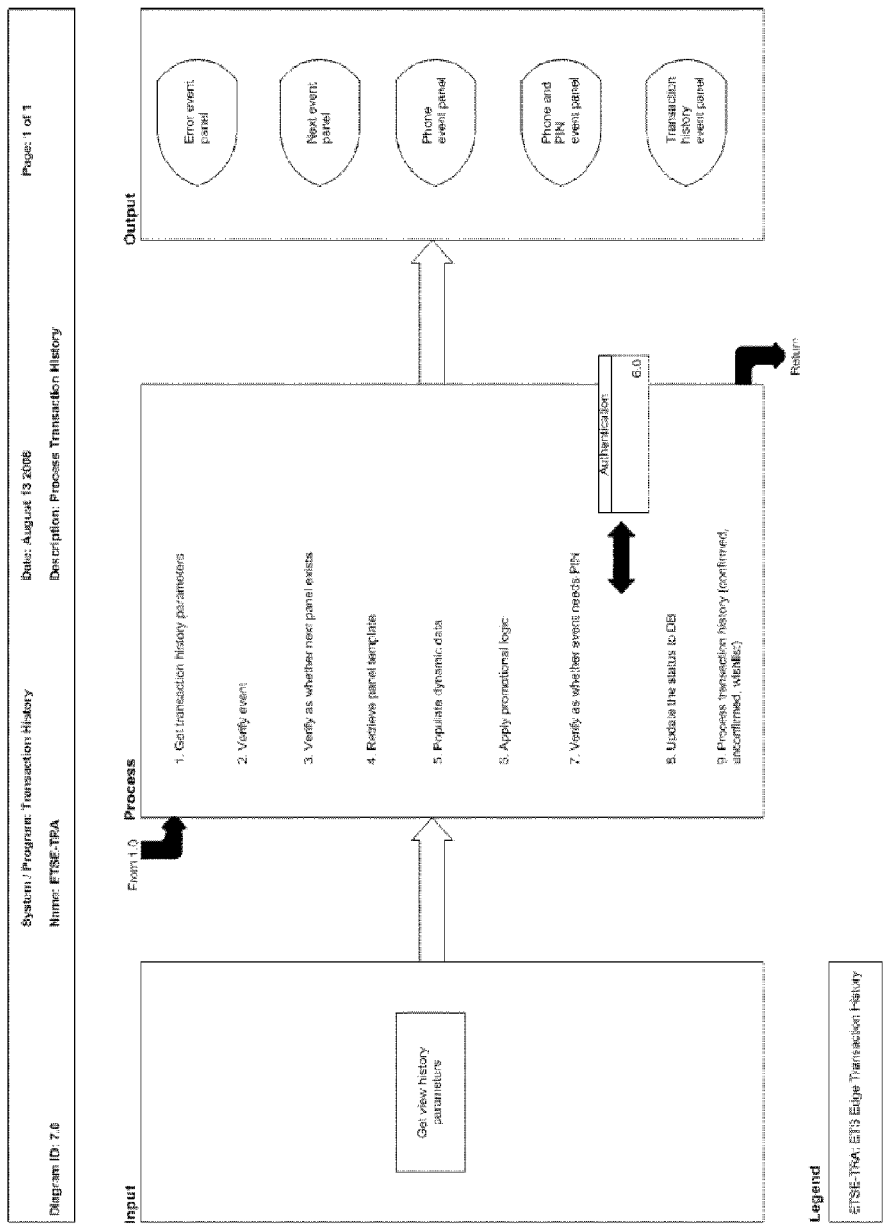
Figure 28:
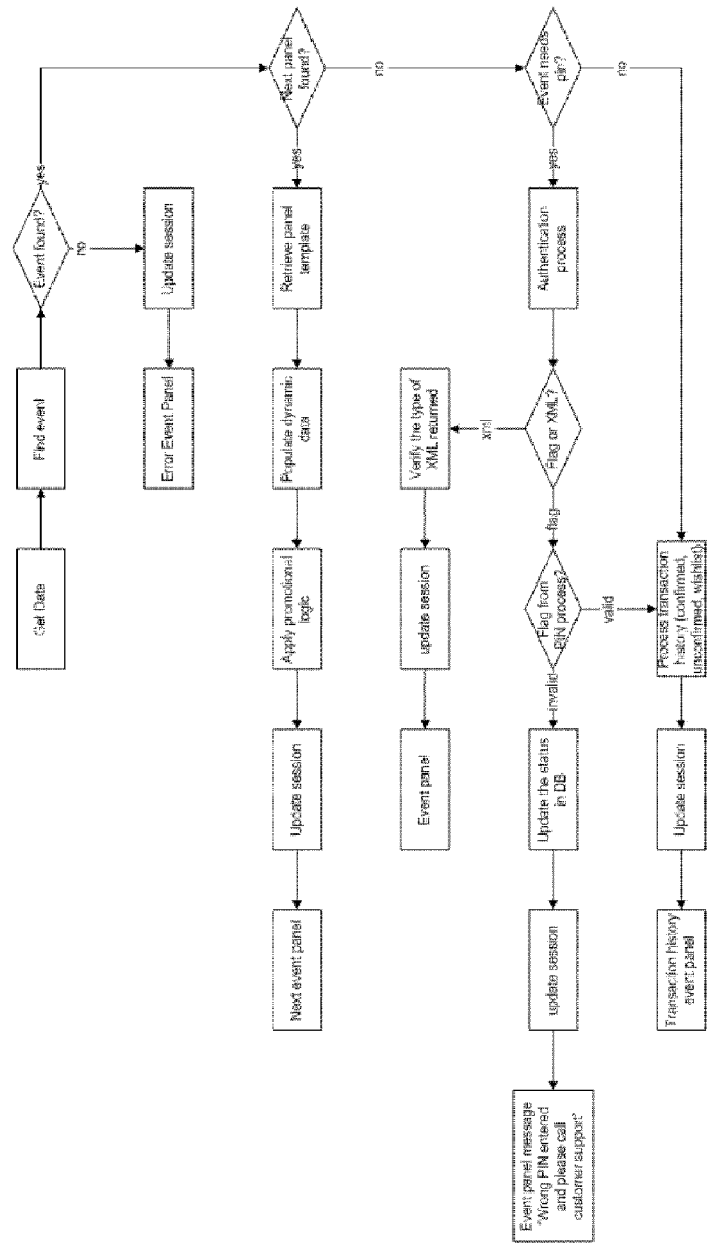

FIG. 7 is a hierarchy chart showing the module hierarchy of the ETS Edge system. Note that there are seven modules:

1. ETS Edge—the main module
2. Purchase
3. Download
4. Poll/Vote
5. Request Info
6. Authentication
7. View Transaction History Following the hierarchy chart are IPO charts for each of the seven modules, and following each IPO chart is an Extended Description for each module and a standard high-level program flow chart for each module. The charts are self-explanatory. They are grouped as follows:

| FIGS. | MODULE | DESCRIPTION |
| --- | --- | --- |
| 8 through 10 | 1.0 | Entry Point - Process All Requests |
| 11 through 13 | 2.0 | Process Purchase Order |
| 14 through 16 | 3.0 | Process Download |
| 17 through 19 | 4.0 | Process Polling/Voting |
| 20 through 22 | 5.0 | Process Request Info |
| 23 through 25 | 6.0 | Process Authentication |
| 26 through 28 | 7.0 | Process Transaction History |

| GLOSSARY | |
| --- | --- |
| ETS | Enhanced Television Services |
| HTTP | Hyper Text Transfer Protocol |
| VPN | Virtual Private Network |
| STB | Set-top Box |
| CSR | Customer Service Representative |
| T-commerce | Television Commerce |
| API | Application Programming Interface |
| MSO | Multi-Service Operator |
| Broadcast | Scheduled Content Sent to Many Receivers Concurrently |
| Transmitted Content | Content Sent Either to a Single Receiver or to Many Receivers |

What is claimed is:

1. A method implemented by a service provider to support interactive video content viewing by a viewer, the method comprising the service provider:

(a) causing an indicator to be included in initial video content transmitted for display by viewer equipment to the viewer, wherein the indicator indicates to the viewer that an interactive session is available;

(b) receiving interactive session results from the interactive session with the viewer responding to the indicator;

(c) creating a transaction based on the interactive session results; and (d) causing the transaction to be fulfilled, wherein transaction fulfillment causes a communication comprising detailed information regarding the transaction to be transmitted to the viewer via one or more of an email message, a text message, and a phone call.

2. The invention of claim 1, wherein, prior to step (a), the service provider establishes an event associated with the interactive session by defining an event ID, event timing, and event data for the event, wherein:

the service provider determines when to cause the indicator to be included in the displayed initial video content based on the event timing; and the service provider transmits the event ID and the event data to the viewer equipment to configure the viewer equipment to:

(1) receive an initial response from the viewer responding to the indicator in the displayed initial video content, the viewer's initial response indicating that the viewer has requested the interactive session;

(2) cause further information for the interactive session to be included in subsequent video content displayed to the viewer, wherein the viewer equipment determines the further information based on the event data received from the service provider; and (3) receive a subsequent response from the viewer responding to the further information in the displayed subsequent video content, wherein the viewer equipment generates and transmits the interactive session results to the service provider based on the viewer's subsequent response and the event ID.

3. The invention of claim 2, wherein the viewer equipment (1) causes the initial video content to be displayed to the viewer with the indicator, (2) receives the viewer's initial response, (3) causes the further information for the interactive session to be included in the displayed subsequent video content, (4) receives the viewer's subsequent response, and (5) generates and transmits the interactive session results to the service provider, all without requiring any intervening communication from the viewer equipment to the service provider.

4. The invention of claim 2, wherein the viewer uses a remote control to transmit the viewer's initial and subsequent responses to the viewer equipment.

5. The invention of claim 4, wherein the remote control is a legacy standard remote control.

6. The invention of claim 4, wherein the viewer equipment comprises (i) a television that displays the initial and subsequent video content and (ii) a set top box that:
- receives the event ID and the event data from the service provider;
- receives the viewer's initial response;
- causes the further information for the interactive session to be included in the displayed subsequent video content displayed;
- receives the viewer's subsequent response; and
- generates and transmits the interactive session results to the service provider.

7. The invention of claim 2, wherein the service provider establishes the event in response to an event request received from a third party.

8. The invention of claim 1, wherein the service provider comprises a core and an edge, wherein:
- the edge causes the indicator to be included in the initial video content transmitted for display by the viewer equipment to the viewer;
- the edge receives the interactive session results;
- the edge creates the transaction based on the interactive session results;
- the edge informs the core about the transaction; and
- the core causes the transaction to be fulfilled, which in turn causes the communication comprising the detailed information regarding the transaction to be transmitted to the viewer via one or more of the email message, the text message, and the phone call.

9. The invention of claim 8, wherein:
- the edge is configured to communicate with multiple instances of viewer equipment for multiple interactive sessions by multiple viewers;
- the edge is associated with a first multi-service operator (MSO); and
- the service provider further comprises one or more different edges associated with one or more different MSOs.

10. The invention of claim 8, wherein the service provider further comprises a proxy configured to translate communications between the edge and the viewer equipment between edge language associated with the edge and viewer-equipment language associated with the viewer equipment.

11. The invention of claim 10, wherein:
- the edge language is XML; and
- the viewer-equipment language is EBIF.

12. The invention of claim 8, wherein the edge (1) causes the indicator to be included in the displayed initial video content, (2) receives the interactive session results, (3) creates the transaction based on the interactive session results, and (4) informs the core about the transaction, all without requiring any intervening communication from the edge to the core.

13. The invention of claim 8, wherein, prior to step (a):
- the core establishes an event associated with the interactive session by defining an event ID, event timing, and event data for the event;
- the core informs the edge about the event;
- the edge determines when to cause the indicator to be included in the displayed initial video content based on the event timing; and
- the edge transmits the event ID and the event data to the viewer equipment to configure the viewer equipment to:
    (1) receive an initial response from the viewer responding to the indicator in the displayed initial video content, the viewer's initial response indicating that the viewer has requested the interactive session;
    (2) cause further information for the interactive session to be included in subsequent video content displayed to the viewer, wherein the viewer equipment determines the further information based on the event data received from the edge; and
    (3) receive a subsequent response from the viewer responding to the further information in the displayed subsequent video content, wherein the viewer equipment generates and transmits the interactive session results to the edge based on the viewer's subsequent response and the event ID.

14. The invention of claim 13, wherein the viewer equipment comprises a set top box that (1) causes the initial video content to be displayed to the viewer with the indicator, (2) receives the viewer's initial response, (3) includes the further information for the interactive session into the displayed subsequent video content, (4) receives the viewer's subsequent response, and (5) generates and transmits the interactive session results to the edge.

15. The invention of claim 8, wherein the core establishes the event in response to an event request from a third party.

16. The invention of claim 1, wherein the service provider fulfills the transaction.

17. The invention of claim 1, wherein the service provider transmits the transaction to a third party for fulfillment.

18. The invention of claim 1, wherein the video content is transmitted to the viewer equipment using cable television service.

19. The invention of claim 1, wherein the video content is transmitted to the viewer equipment using a satellite and a receiving antenna.

20. The invention of claim 1, wherein the video content is transmitted to the viewer equipment using cellular telephone service.

21. The invention of claim 1, wherein the video content is transmitted to the viewer equipment using the Internet.

22. The invention of claim 1, wherein:
the interactive session results comprise voting/polling results from the viewer; and the communication provides, to the viewer, voting/polling results for multiple viewers.

23. The invention of claim 1, wherein:
the interactive session results comprise a request by the viewer for a product; and
the communication provides, to the viewer, the detailed information associated with the product request.

24. The invention of claim 23, wherein:
the transaction fulfillment corresponds to a purchase of the product; and
the communication confirms the product purchase.

25. The invention of claim 23, wherein:
the transaction fulfillment initiates a purchase of the product; and
the communication enables the viewer to complete the product purchase.

26. The invention of claim 1, wherein:
the interactive session results comprise a request by the viewer for a digital download; and
the communication provides, to the viewer, a link for downloading the digital download.

27. The invention of claim 1, wherein:
the interactive session results comprise a request by the viewer for a history of past interactive sessions by the viewer; and
the transaction fulfillment provides the history to the viewer.

28. The invention of claim 27, wherein the history identifies each past interactive session as confirmed, unconfirmed, or wish list.

29. The invention of claim 27, wherein the service provider causes an email or text message to be transmitted to the viewer to enable the viewer to access the history.

30. The invention of claim 27, wherein the service provider transmits the history to the viewer equipment for display to the viewer.

31. The invention of claim 1, wherein:
the interactive session involves creation or modification of a wish list by the viewer; and
the transaction fulfillment involves enabling the viewer to complete items on the wish list.

32. A service provider for supporting interactive video content viewing by a viewer, the service provider configured to:
(a) cause an indicator to be included in initial video content transmitted for display by viewer equipment to the viewer, wherein the indicator indicates to the viewer that an interactive session is available;
(b) receive interactive session results from the interactive session with the viewer responding to the indicator;
(c) create a transaction based on the interactive session results; and
(d) cause the transaction to be fulfilled, wherein transaction fulfillment causes a communication comprising detailed information regarding the transaction to be transmitted to the viewer via one or more of an email message, a text message, and a phone call.

33. The invention of claim 32, wherein, prior to step (a), the service provider establishes an event associated with the interactive session by defining an event ID, event timing, and event data for the event, wherein:
the service provider determines when to cause the indicator to be included in the displayed initial video content based on the event timing; and
the service provider transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the service provider; and
(3) receive a subsequent response from the viewer responding to the further information in the displayed subsequent video content, wherein the viewer equipment generates and transmits the interactive session results to the service provider based on the viewer's subsequent response and the event ID.

34. The invention of claim 33, wherein the viewer equipment (1) causes the initial video content to be displayed to the viewer with the indicator, (2) receives the viewer's initial response, (3) causes the further information for the interactive session to be included in the displayed subsequent video content, (4) receives the viewer's subsequent response, and (5) generates and transmits the interactive session results to the service provider, all without requiring any intervening communication from the viewer equipment to the service provider.

35. The invention of claim 33, wherein the service provider establishes the event in response to an event request received from a third party.

36. The invention of claim 32, wherein the service provider comprises a core and an edge, wherein:
the edge causes the indicator to be included in the initial video content transmitted for display by the viewer equipment to the viewer;
the edge receives the interactive session results;
the edge creates the transaction based on the interactive session results;
the edge informs the core about the transaction; and
the core causes the transaction to be fulfilled, which in turn causes the communication comprising the detailed information regarding the transaction to be transmitted to the viewer via one or more of the email message, the text message, and the phone call.

37. The invention of claim 36, wherein:
the edge is configured to communicate with multiple instances of viewer equipment for multiple interactive sessions by multiple viewers;
the edge is associated with a first multi-service operator (MSO); and
the service provider further comprises one or more different edges associated with one or more different MSOs.

38. The invention of claim 36, wherein the service provider further comprises a proxy configured to translate communications between the edge and the viewer equipment between edge language associated with the edge and viewer-equipment language associated with the viewer equipment.

39. The invention of claim 38, wherein:
the edge language is XML; and
the viewer-equipment language is EBIF.

40. The invention of claim 36, wherein the edge (1) causes the indicator to be included in the displayed initial video content, (2) receives the interactive session results, (3) creates the transaction based on the interactive session results, and (4) informs the core about the transaction, all without requiring any intervening communication from the edge to the core.

41. The invention of claim 36, wherein, prior to step (a):
the core establishes an event associated with the interactive session by defining an event ID, event timing, and event data for the event;
the core informs the edge about the event;
the edge determines when to cause the indicator to be included in the displayed initial video content based on the event timing; and
the edge transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the edge; and
(3) receive a subsequent response from the viewer responding to the further information in the displayed subsequent video content, wherein the viewer equipment generates and transmits the interactive session results to the edge based on the viewer's subsequent response and the event ID.

42. The invention of claim 41, wherein the viewer equipment comprises a set top box that (1) causes the initial video content to be displayed to the viewer with the indicator, (2) receives the viewer's initial response, (3) includes the further information for the interactive session into the displayed subsequent video content, (4) receives the viewer's subsequent response, and (5) generates and transmits the interactive session results to the edge.

43. The invention of claim 36, wherein the core establishes the event in response to an event request from a third party.

44. The invention of claim 32, wherein the service provider fulfills the transaction.

45. The invention of claim 32, wherein the service provider transmits the transaction to a third party for fulfillment.

46. The invention of claim 32, wherein the video content is transmitted to the viewer equipment using cable television service.

47. The invention of claim 32, wherein the video content is transmitted to the viewer equipment using a satellite and a receiving antenna.

48. The invention of claim 32, wherein the video content is transmitted to the viewer equipment using cellular telephone service.

49. The invention of claim 32, wherein the video content is transmitted to the viewer equipment using the Internet.

50. The invention of claim 32, wherein:
the interactive session results comprise voting/polling results from the viewer; and
the communication provides, to the viewer, voting/polling results for multiple viewers.

51. The invention of claim 32, wherein:
the interactive session results comprise a request by the viewer for a product; and
the communication provides, to the viewer, the detailed information associated with the product request.

52. The invention of claim 51, wherein:
the transaction fulfillment corresponds to a purchase of the product; and
the communication confirms the product purchase.

53. The invention of claim 52, wherein:
the transaction fulfillment initiates a purchase of the product; and
the communication enables the viewer to complete the product purchase.

54. The invention of claim 32, wherein:
the interactive session results comprise a request by the viewer for a digital download; and
the communication provides, to the viewer, a link for downloading the digital download.

55. The invention of claim 32, wherein:
the interactive session results comprise a request by the viewer for a history of past interactive sessions by the viewer; and
the transaction fulfillment provides the history to the viewer.

56. The invention of claim 55, wherein the history identifies each past interactive session as confirmed, unconfirmed, or wish list.

57. The invention of claim 55, wherein the service provider causes an email or text message to be transmitted to the viewer to enable the viewer to access the history.

58. The invention of claim 55, wherein the service provider transmits the history to the viewer equipment for display to the viewer.

59. The invention of claim 32, wherein:
the interactive session involves creation or modification of a wish list by the viewer; and
the transaction fulfillment involves enabling the viewer to complete items on the wish list.

60. Viewer equipment for supporting interactive video content viewing by a viewer, the viewer equipment configured to:
(a) receive an event ID and event data for an event from a service provider;
(b) cause initial video content to be displayed to the viewer, wherein the displayed initial video content includes an indicator indicating to the viewer that an interactive session is available;
(c) receive an initial response from the viewer responding to the indicator in the displayed initial video content, the viewer's initial response indicating that the viewer has requested the interactive session;
(d) determines further information for the interactive session based on the event data received from the service provider;
(e) cause the further information for the interactive session to be included in subsequent video content displayed to the viewer;
(f) receive a subsequent response from the viewer responding to the further information; and
(g) generate and transmit interactive session results to the service provider based on the viewer's subsequent response and the event ID, wherein the viewer equipment performs all of functions (b)-(g) without requiring any intervening communication from the viewer equipment to the service provider.

61. The invention of claim 60, wherein the viewer uses a remote control to transmit the viewer's initial and subsequent responses to the viewer equipment.

62. The invention of claim 61, wherein the remote control is a standard remote control.

63. The invention of claim 61, wherein the viewer equipment comprises a set top box that performs functions (a)-(g).

64. The invention of claim 60, wherein the interactive session results are further generated based on a viewer ID for the viewer.

65. A method implemented by a service provider to support interactive video content viewing by a viewer, the method comprising the service provider:

(a) causing an indicator to be included in initial video content transmitted for display by viewer equipment to the viewer, wherein the indicator indicates to the viewer that an interactive session is available;
(b) receiving interactive session results from the interactive session with the viewer responding to the indicator;
(c) creating a transaction based on the interactive session results; and
(d) causing the transaction to be fulfilled, wherein, prior to step (a), the service provider establishes an event associated with the interactive session by defining an event ID, event timing, and event data for the event, wherein:
the service provider determines when to cause the indicator to be included in the displayed initial video content based on the event timing; and
the service provider transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the service provider; and
(3) receive a subsequent response from the viewer responding to the further information in the displayed subsequent video content, wherein the viewer equipment generates and transmits the interactive session results to the service provider based on the viewer's subsequent response and the event ID, wherein the service provider establishes the event in response to an event request received from a third party.

66. A method implemented by a service provider to support interactive video content viewing by a viewer, the method comprising the service provider:
(a) causing an indicator to be included in initial video content transmitted for display by viewer equipment to the viewer, wherein the indicator indicates to the viewer that an interactive session is available;
(b) receiving interactive session results from the interactive session with the viewer responding to the indicator;
(c) creating a transaction based on the interactive session results; and
(d) causing the transaction to be fulfilled, wherein:
the interactive session results comprise a request by the viewer for a history of past interactive sessions by the viewer; and
the transaction fulfillment provides the history to the viewer.

67. The invention of claim 66, wherein the history identifies each past interactive session as confirmed, unconfirmed, or wish list.

68. The invention of claim 66, wherein the service provider causes an email or text message to be transmitted to the viewer to enable the viewer to access the history.

69. The invention of claim 66, wherein the service provider transmits the history to the viewer equipment for display to the viewer.

70. A method implemented by a service provider to support interactive video content viewing by a viewer, the method comprising the service provider:
(a) causing an indicator to be included in initial video content transmitted for display by viewer equipment to the viewer, wherein the indicator indicates to the viewer that an interactive session is available;
(b) receiving interactive session results from the interactive session with the viewer responding to the indicator;
(c) creating a transaction based on the interactive session results; and
(d) causing the transaction to be fulfilled, wherein:
the interactive session involves creation or modification of a wish list by the viewer; and
the transaction fulfillment involves enabling the viewer to complete items on the wish list.

71. A service provider for supporting interactive video content viewing by a viewer, the service provider configured to:
(a) cause an indicator to be included in initial video content transmitted for display by viewer equipment to the viewer, wherein the indicator indicates to the viewer that an interactive session is available;
(b) receive interactive session results from the interactive session with the viewer responding to the indicator;
(c) create a transaction based on the interactive session results; and
(d) cause the transaction to be fulfilled, wherein, prior to step (a), the service provider establishes an event associated with the interactive session by defining an event ID, event timing, and event data for the event, wherein:
the service provider determines when to cause the indicator to be included in the displayed initial video content based on the event timing; and
the service provider transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the service provider; and
(3) receive a subsequent response from the viewer responding to the further information in the displayed subsequent video content, wherein the viewer equipment generates and transmits the interactive session results to the service provider based on the viewer's subsequent response and the event ID, wherein the service provider establishes the event in response to an event request received from a third party.

72. A service provider for supporting interactive video content viewing by a viewer, the service provider configured to:
(a) cause an indicator to be included in initial video content transmitted for display by viewer equipment to the viewer, wherein the indicator indicates to the viewer that an interactive session is available;
(b) receive interactive session results from the interactive session with the viewer responding to the indicator;
(c) create a transaction based on the interactive session results; and
(d) cause the transaction to be fulfilled, wherein:
the interactive session results comprise a request by the viewer for a history of past interactive sessions by the viewer; and
the transaction fulfillment provides the history to the viewer.

73. The invention of claim 72, wherein the history identifies each past interactive session as confirmed, unconfirmed, or wish list.

74. The invention of claim 72, wherein the service provider causes an email or text message to be transmitted to the viewer to enable the viewer to access the history.

75. The invention of claim 72, wherein the service provider transmits the history to the viewer equipment for display to the viewer.

76. A service provider for supporting interactive video content viewing by a viewer, the service provider configured to:
(a) cause an indicator to be included in initial video content transmitted for display by viewer equipment to the viewer, wherein the indicator indicates to the viewer that an interactive session is available;
(b) receive interactive session results from the interactive session with the viewer responding to the indicator;
(c) create a transaction based on the interactive session results; and
(d) cause the transaction to be fulfilled, wherein:
the interactive session involves creation or modification of a wish list by the viewer; and
the transaction fulfillment involves enabling the viewer to complete items on the wish list.

77. A method implemented by a service provider to support interactive video content viewing by a viewer, the method comprising the service provider:
(a) causing an indicator to be included in initial video content transmitted for display by viewer equipment to the viewer, wherein the indicator indicates to the viewer that an interactive session is available;
(b) receiving interactive session results from the interactive session with the viewer responding to the indicator;
(c) creating a transaction based on the interactive session results; and
(d) causing the transaction to be fulfilled, prior to step (a), the service provider establishes an event associated with the interactive session by defining an event ID, event timing, and event data for the event, wherein:
the service provider determines when to cause the indicator to be included in the displayed initial video content based on the event timing; and
the service provider transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the service provider; and
(3) receive a subsequent response from the viewer responding to the further information in the displayed subsequent video content, wherein the viewer equipment generates and transmits the interactive session results to the service provider based on the viewer's subsequent response and the event ID, wherein the viewer equipment (1) causes the initial video content to be displayed to the viewer with the indicator, (2) receives the viewer's initial response, (3) causes the further information for the interactive session to be included in the displayed subsequent video content, (4) receives the viewer's subsequent response, and (5) generates and transmits the interactive session results to the service provider, all without requiring any intervening communication from the viewer equipment to the service provider.

78. A service provider for supporting interactive video content viewing by a viewer, the service provider configured to:
(a) cause an indicator to be included in initial video content transmitted for display by viewer equipment to the viewer, wherein the indicator indicates to the viewer that an interactive session is available;
(b) receive interactive session results from the interactive session with the viewer responding to the indicator;
(c) create a transaction based on the interactive session results; and
(d) cause the transaction to be fulfilled, wherein, prior to step (a), the service provider establishes an event associated with the interactive session by defining an event ID, event timing, and event data for the event, wherein:
the service provider determines when to cause the indicator to be included in the displayed initial video content based on the event timing; and
the service provider transmits the event ID and the event data to the viewer equipment to configure the viewer equipment to:
(1) receive an initial response from the viewer responding to the indicator in the displayed initial video content, the viewer's initial response indicating that the viewer has requested the interactive session;
(2) cause further information for the interactive session to be included in subsequent video content displayed to the viewer, wherein the viewer equipment determines the further information based on the event data received from the service provider; and
(3) receive a subsequent response from the viewer responding to the further information in the displayed subsequent video content, wherein the viewer equipment generates and transmits the interactive session results to the service provider based on the viewer's subsequent response and the event ID, wherein the viewer equipment (1) causes the initial video content to be displayed to the viewer with the indicator, (2) receives the viewer's initial response, (3) causes the further information for the interactive session to be included in the displayed subsequent video content, (4) receives the viewer's subsequent response, and (5) generates and transmits the interactive session results to the service provider, all without requiring any intervening communication from the viewer equipment to the service provider.

* * * * *

UNITED STATES PATENT AND TRADEMARK OFFICE
CERTIFICATE OF CORRECTION

PATENT NO.        : 8,776,140 B2
APPLICATION NO.   : 13/372707
DATED             : July 8, 2014
INVENTOR(S)       : Michael L. Huegel et al.

It is certified that error appears in the above-identified patent and that said Letters Patent is hereby corrected as shown below:

In the Claims

- In column 17, line 30, Claim 5, remove "legacy".

Signed and Sealed this
Twenty-sixth Day of May, 2015

Michelle K. Lee
*Director of the United States Patent and Trademark Office*